United States Patent
Matsushita et al.

(10) Patent No.: US 10,357,863 B2
(45) Date of Patent: Jul. 23, 2019

(54) ERROR IDENTIFICATION METHOD OF MACHINE TOOL AND ERROR IDENTIFICATION SYSTEM OF THE SAME

(71) Applicant: Okuma Corporation, Niwa-Gun (JP)

(72) Inventors: Tetsuya Matsushita, Niwa-Gun (JP); Reiji Kanbe, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 233 days.

(21) Appl. No.: 15/484,412

(22) Filed: Apr. 11, 2017

(65) Prior Publication Data

US 2017/0297160 A1 Oct. 19, 2017

(30) Foreign Application Priority Data

Apr. 19, 2016 (JP) .................................. 2016-083860
Feb. 6, 2017 (JP) .................................. 2017-019723

(51) Int. Cl.
*B23Q 17/22* (2006.01)
*G01B 5/008* (2006.01)
*B23Q 17/24* (2006.01)

(52) U.S. Cl.
CPC ..... *B23Q 17/2233* (2013.01); *B23Q 17/2428* (2013.01); *G01B 5/008* (2013.01)

(58) Field of Classification Search
CPC B23Q 17/2233; B23Q 17/2428; G01B 5/008; G01B 5/016
USPC .................................... 33/503, 502; 73/1.79
See application file for complete search history.

(56) References Cited

U.S. PATENT DOCUMENTS

| 4,945,501 A * | 7/1990 | Bell ...................... G01B 7/008 318/632 |
| 6,178,389 B1 * | 1/2001 | Sola ...................... G01B 5/008 33/503 |
| 7,055,367 B2 * | 6/2006 | Hajdukiewicz ...... G01B 21/042 33/501.02 |

(Continued)

FOREIGN PATENT DOCUMENTS

| GB | 2 108 715 A | 5/1983 |
| JP | 58-082649 A1 | 5/1983 |

(Continued)

*Primary Examiner* — Christopher W Fulton
(74) *Attorney, Agent, or Firm* — Burr & Brown, PLLC

(57) ABSTRACT

An error identification method includes a tool sensor position acquisition stage, a reference block position acquisition stage, a relative position calculation stage, a reference tool position acquisition stage, a position measurement sensor measurement stage, a length compensation value calculation stage, a diameter compensation value acquisition stage, a position measurement stage, a position compensation stage, and a geometric error identification stage. The diameter compensation value acquisition stage acquires a radial direction compensation value of the position measurement sensor with the measured jig. The position measurement stage indexes the rotation axis to a plurality of any given angles and measures respective positions of the measured jig. The position compensation stage compensates the position measurement value at the position measurement stage using the length direction compensation value and the radial direction compensation value. The geometric error identification stage identifies the geometric error from the plurality of position measurement values.

14 Claims, 19 Drawing Sheets

(56) References Cited

U.S. PATENT DOCUMENTS

| | | | |
|---|---|---|---|
| 8,800,159 B2* | 8/2014 | Matsushita | G05B 19/404 33/503 |
| 2010/0082289 A1* | 4/2010 | Staaden | G01B 5/241 702/150 |
| 2011/0040523 A1 | 2/2011 | Matsushita | |
| 2012/0253505 A1* | 10/2012 | Matsushita | G05B 19/401 700/193 |
| 2012/0253506 A1* | 10/2012 | Matsushita | B23Q 1/5406 700/193 |
| 2013/0192054 A1 | 8/2013 | Sato | |
| 2015/0160049 A1* | 6/2015 | Oki | G01B 21/042 702/97 |
| 2015/0292852 A1* | 10/2015 | Oki | G01B 21/042 33/502 |
| 2016/0116275 A1* | 4/2016 | Matsushita | G01B 21/042 702/95 |
| 2016/0246282 A1* | 8/2016 | Matsushita | G05B 19/404 |
| 2017/0299366 A1* | 10/2017 | Kanbe | G01B 5/016 |
| 2017/0308055 A1* | 10/2017 | Hoshino | G05B 19/409 |

FOREIGN PATENT DOCUMENTS

| | | |
|---|---|---|
| JP | 04-063664 A1 | 2/1992 |
| JP | 2001-105279 A1 | 4/2001 |
| JP | 2011-038902 A1 | 2/2011 |
| JP | 2012-061570 A1 | 3/2012 |

* cited by examiner

ERROR IDENTIFICATION METHOD OF MACHINE TOOL AND ERROR IDENTIFICATION SYSTEM OF THE SAME

BACKGROUND OF THE INVENTION

This application claims the benefit of Japanese Patent Application Numbers 2016-083860 filed on Apr. 19, 2016 and 2017-019723 filed on Feb. 6, 2017, the entirety of which is incorporated by reference.

1. Field of the Invention

The present invention relates to a method that identifies a geometric error in a machine tool from a measurement result of a position of an object in the machine and a system that identifies the geometric error.

2. Description of Related Art

FIG. 1 is a schematic diagram of a five-axis-control machining center that includes three translational axes and two rotation axes. A motion of two degrees of freedom for translation of the main spindle 2 in X-axis and Z-axis directions, which are the translational axes and are orthogonal to one another, is possible with respect to the bed 1. A motion of one degree of freedom for rotation of the table 3 in a C-axis direction, which is the rotation axis, is possible with respect to the cradle 4. A motion of one degree of freedom for rotation of the cradle 4 in an A-axis direction, which is the rotation axis, is possible with respect to the trunnion 5. The A-axis and the C-axis are orthogonal to one another. Furthermore, a motion of one degree of freedom for translation of the trunnion 5 in a Y-axis direction, which is the translational axis and orthogonal to the X-axis and the Z-axis directions, is possible with respect to the bed 1. Accordingly, the motions of the three degrees of freedom for translation and the two degrees of freedom for rotation of the main spindle 2 are possible with respect to the table 3. Servo motors, which are controlled by a numerical control unit (not illustrated), drive respective feed axes. A workpiece is secured to the table 3, and a tool is installed on the main spindle 2 and rotated. Accordingly, the workpiece can be processed in a relative position and a relative posture which are controlled.

There is a geometric error between the respective axes, such as an error in the center position of the rotation axis (a displacement from an assumed position) and a tilt error of the rotation axes (squareness and parallelism between the axes), which are major factors affecting the motion accuracy of the five-axis-control machining center. For example, in the five-axis-control machining center in FIG. 1, there are 13 geometric errors in total: three geometric errors of the squareness between the X and Y axes, the squareness between the Y and Z axes, and the squareness between the Z and X axes as geometric errors related to the translational axes; two geometric errors of the squareness between the tool and the Y-axis and the squareness between the tool and the X-axis as geometric errors related to the main spindle; and eight geometric errors of the X-direction error of the C-axis center position, the offset error between the C and A axes, the angular offset error of the A-axis, the squareness between the C and A axes, the Y-direction error of the A-axis center position, the Z-direction error of the A-axis center position, the squareness between the A and Z axes, and the squareness between the A and Y axes as geometric errors related to the rotation axes.

The geometric errors deteriorate the motion accuracy of the machine, thus deteriorating the process accuracy of the workpiece. In view of this, the geometric errors need to be reduced through adjustment, but it is difficult to zero the geometric errors.

Performing a control to compensate for the geometric error makes highly-accurate processes possible.

Such a compensation control requires measuring or identifying the geometric error in the machine. The inventor proposed a method to identify the geometric error in the machine as disclosed in Japanese Unexamined Patent Application Publication No. 2011-38902. In the method of the disclosure, a table is rotated and indexed at a plurality of angles in rotation axes. The respective center positions of a ball secured on the table are measured using a touch trigger probe mounted to a main spindle so that the geometric error in the machine is identified from the acquired measurement values.

The touch trigger probe includes a sensor that senses contact with a measurement target. At the moment of sensing the contact, the sensor transmits a signal over infrared light and radio waves, for example. A receiver coupled to a numeral value control unit acquires the current positions of the respective axes (skip values) at the moment of the reception of the signal or a time point considering the delay, and these values are determined as the measurement values.

However, measurement by the touch trigger probe requires compensations for the acquired positions. This is due to the fact that the contact points of control points, as references of the positions of the feed axes (X and Y-axes are a main spindle center and the Z-axis is a main spindle end surface) with the touch trigger probe, differ from the positions of the feed axes when the touch trigger probe contacts the measurement target. For example, the X- and Y-axis directions are shifted by the radius of the stylus ball of the touch trigger probe. The shift occurs due to a displacement between the main spindle center and the core of the touch trigger probe, the delay of the signal in contact, and directional dependency of the sensor in the touch trigger probe, for example. The X- and Y-axis directions are shifted by the amounts of the lengths of the touch trigger probe body and the stylus in the Z-axis direction, and the shift occurs due to the signal delay in contact, for example. Accordingly, calibration is needed to acquire the compensation values to compensate for these shifts.

As disclosed in Japanese Unexamined Patent Application Publication No. 4-63664 and Japanese Unexamined Patent Application Publication No. 58-82649, there are known calibration methods for determining the radial direction compensation value of the touch trigger probe.

In the method disclosed in JP-A-4-63664, the main spindle center position is adjusted so as to match a center of a ring gauge as a reference with the main spindle center using a dial gauge. The diameter compensation value of the touch trigger probe is acquired from a skip value when the touch trigger probe is brought into contact with the inner diameter of the ring gauge and an inner diameter value of the ring gauge.

In the method disclosed in JP-A-58-82649, the touch trigger probe is brought into contact with the bore inner diameter as a reference in one direction. When the touch trigger probe contacts the bore inner diameter in the opposite direction, the main spindle is rotated by 180° and the bore center position is acquired from an average value of both skip values and then the compensation values in the respective directions are acquired.

On the other hand, a method using a reference tool (hereinafter referred to as "method 1") has been known as a calibration method for a length compensation value. In method 1, the reference tool is installed on the main spindle, and the position at which a clearance between the block gauge and the reference tool becomes almost 0 is found and recorded. The position is determined from resistance when the block gauge is manually moved while the Z-axis is manually operated such that the reference tool contacts a reference surface, such as a table top surface, via the block gauge. Next, the touch trigger probe measures the reference surface, that is, acquires the Z-axis position when the touch trigger probe is in contact. The length of the touch trigger probe in contact, namely, the length compensation value of the touch trigger probe, is acquired from the value found by subtracting the recorded Z-axis position of the reference tool and the thickness of the block gauge from the Z-axis position acquired by the touch trigger probe.

Japanese Unexamined Patent Application Publication No. 2012-61570 discloses a method for measuring the length of the touch trigger probe in contact using a CCD camera. With this method, the touch trigger probe is brought in contact with a top surface of a holding block, the position of the main spindle is acquired when a signal is output, and the distal end of the touch trigger probe in contact is photographed by the CCD camera to measure the distal end position. Next, the holding block is removed to recover the length when the touch trigger probe is not in contact and measures the distal end position with the CCD camera. The amount of shrinkage in contact is calculated from the difference between both distal end positions. The distal end position of the reference tool is measured by the CCD camera, so that the position of the main spindle is acquired at the time, as well. The length of the touch trigger probe in contact, namely, the length compensation value of the touch trigger probe, is acquired from the relationship between the acquired amount of shrinkage in contact, the distal end position of the touch trigger probe in contact, the main spindle position while the touch trigger probe is in contact, the distal end position of the reference tool, and the main spindle position with the reference tool.

Furthermore, Japanese Unexamined Patent Application Publication No. 2001-105279 discloses a compensation method for a workpiece position using a laser sensor and a reference block. When the laser light is obstructed by the tool distal end, and therefore the light-receiving rate becomes a certain rate or less, the laser sensor generates a signal. The positions of the feed axes at the time point when the control device of the machine tool receives the signal are determined as measurement values. With the method, the reference block is prepared near the laser sensor and a position of the laser light is matched with a position (height) of a top surface of the reference block. The laser sensor stores the position with the reference tool installed. Next, the touch trigger probe is brought into contact with the reference block and the position is also stored, and the touch trigger probe is also brought into contact with the workpiece and the position is stored. The workpiece position with respect to the reference tool is measured and compensated by a difference between both positions and the position of the reference tool. In this method, the workpiece position is measured without acquiring the length compensation value of the touch trigger probe.

Calibration of the touch trigger probe needs to be performed before the measurement of the identification of geometric error. Moreover, the state of the touch trigger probe changes due to thermal displacement due to heat generation in the main spindle and a secular change, and thus, the required compensation value changes. In view of this, the calibration is preferably performed immediately before the measurement.

However, the methods in JP-A-4-63664 and JP-A-58-82649 have a problem with respect to the necessity of additionally preparing another measuring device, such as a dial gauge, and the reference of the workpiece with the ring gauge and the bore.

Furthermore, since JP-A-4-63664, JP-A-58-82649, and method 1 require manual work, this makes the work troublesome. Accordingly, once performed, the calibration is not often performed again thereafter. In this case, if the state of the touch trigger probe changes due to such factors as thermal distortion, the measurement accuracy of the touch trigger probe deteriorates, causing the problem of failing to identify the geometric error in the machine with a high degree of accuracy.

The method of JP-A-2012-61570 has the problem of requiring the measuring device, and the expensive CCD camera. Additionally, since the holding block needs to be moved, this causes the problem of reduction in work frequency due to manual working. To automatically remove the holding block, a mechanism for driving the holding block and the actuator are required, causing the problem of increasing costs.

Further, JP-A-2001-105279 discloses a method for measuring the position of the workpiece without the use of the length compensation value of the touch trigger probe. However, this method requires matching the laser light position of the laser sensor with the reference block position or knowing the positional relationship between both in advance. The required information in the method of JP-A-2001-105279 means that the relationship between the length of the reference tool measured by the laser sensor and the length of the touch trigger probe with which the reference block is brought into contact, that is, the length compensation value of the touch trigger probe, needs to be known in advance. However, JP-A-2001-105279 does not disclose a method for determining the positional relationship between both in advance.

SUMMARY OF THE INVENTION

Therefore, an object of the present invention is to provide an error identification method and an error identification system that can concurrently perform calibrations of diameter/length compensation values of a position measurement sensor, when a measured jig, such as a target ball, is measured with the position measurement sensor, such as the touch trigger probe, to identify the geometric error in a machine tool that includes three translational axes and at least one rotation axis, from a position of the measured jig.

In order to achieve the above-described object, an error identification method according to a first aspect of the present invention is provided. The error identification method is used for measuring the position of the measured jig in a three-dimensional space, wherein the measured jig is secured on a table by a position measurement sensor installed on a main spindle in a machine tool. The machine tool includes three or more translational axes, one or more rotation axes, a rotatable main spindle to which a tool is to be installed, the table, and a control device configured to control the respective translational axes, rotation axis, and the main spindle. The error identification method identifies the geometric error in the machine tool from the value of the measured position (position measurement value). The error identification method executes a tool sensor position acquisition stage, a reference block position acquisition stage, a relative position calculation stage, a reference tool position acquisition stage, a position measurement sensor measurement stage, a length compensation value calculation stage, a diameter compensation value acquisition stage, a position measurement stage, a position compensation stage, and a geometric error identification stage. The tool sensor position acquisition stage installs a reference tool for a length reference of the tool to the main spindle, and acquires a sensing position of a distal end of the reference tool with the tool sensor. The reference block position acquisition stage acquires positions of the translational axes when the reference tool installed on the main spindle is directly or indirectly brought into contact with the reference block disposed at the tool sensor side. The relative position calculation stage calculates a relative position of the reference block with respect to the sensing position from the sensing position acquired in the tool sensor position acquisition stage and the positions of the translational axes acquired in the reference block position acquisition stage. The reference tool position acquisition stage installs the reference tool to the main spindle and acquires the reference tool position with the tool sensor. The reference tool position is a distal end position of the reference tool. The position measurement sensor measurement stage installs the position measurement sensor to the main spindle and measures the position of the reference block with the position measurement sensor. The length compensation value calculation stage calculates a length direction compensation value of the position measurement sensor from the reference tool position acquired in the reference tool position acquisition stage, the position of the reference block measured in the position measurement sensor measurement stage, the relative position calculated in the relative position calculation stage, and the length of the reference tool. The diameter compensation value acquisition stage acquires the radial direction compensation value of the position measurement sensor with the measured jig. The position measurement stage indexes the rotation axis to a plurality of any given angles and measures the respective positions of the measured jig by the position measurement sensor. The position compensation stage compensates for the position measurement value at the position measurement stage using the length direction compensation value and the radial direction compensation value. The geometric error identification stage identifies the geometric error from the plurality of position measurement values compensated by the position compensation stage.

Here, "the tool sensor side" includes the case of directly disposing the reference block to the tool sensor, and also includes the case of disposing the reference block separately near the tool sensor. The same applies with respect to the following.

With the error identification method according to a second aspect of the present invention, the tool sensor position acquisition stage to the relative position calculation stage is configured to be executed once. The reference tool position acquisition stage to the geometric error identification stage is configured to be executed several times.

With the error identification method according to a third aspect of the present invention, the positions measured by the position measurement sensor are positions of the translational axes when the position measurement sensor senses contact with the measurement object.

With the error identification method according to a fourth aspect of the present invention, the positions measured by the tool sensor are positions of the translational axes when the tool installed on the main spindle moves in the translational axes, and the tool sensor senses contact with the tool or passing of the tool.

With the error identification method according to a fifth aspect of the present invention, the measured jig has a spherical shape.

With the error identification method according to a sixth aspect of the present invention, the diameter compensation value acquisition stage measures an initial position of the measured jig by the position measurement sensor. The diameter compensation value acquisition stage acquires a compensation value of the position measurement sensor in a radial direction.

In order to achieve the above-described object, an error identification system according to a seventh aspect of the present invention is provided. The error identification system is used for measuring a position of the measured jig in three-dimensional space, wherein the measured jig is secured on a table by a position measurement sensor installed on a main spindle in the machine tool. The machine tool includes three or more translational axes, one or more rotation axes, the rotatable main spindle to which the tool is to be installed, the table, and the control device configured to control the respective translational axes, the rotation axis, and the main spindle. The error identification system identifies the geometric error in the machine tool from a value of the measured position (the position measurement value). The error identification system includes a reference tool, a tool sensor, a reference block, a tool sensor position acquisition means, a reference block position acquisition means, a relative position calculation means, a reference tool position acquisition means, a measurement position acquisition means, a length compensation value calculation means, a diameter compensation value acquisition means, a position compensation means, and a geometric error identification means. The reference tool is for a length reference of the tool. The tool sensor is configured to detect a distal end position of the reference tool installed on the main spindle. The reference block is installed on the tool sensor side. The tool sensor position acquisition means is configured to move the reference tool installed on the main spindle in the translational axes to acquire and store a sensing position of the distal end of the reference tool with respect to the tool sensor. The reference block position acquisition means is configured to move the reference tool installed on the main spindle in the translational axes to directly or indirectly bring the reference tool into contact with the reference block. The reference block position acquisition means is configured to acquire and store positions of the translational axes at the contact. The relative position calculation means is configured to calculate and store a relative position of the reference block with respect to the sensing position from the sensing position acquired in the tool sensor position acquisition means, and the positions of the translational axes acquired in the reference block position acquisition means. The reference tool position acquisition means is configured to move the reference tool installed on the main spindle in the translational axes. The reference tool position acquisition means is configured to acquire and store a reference tool position with the tool sensor. The reference tool position is the distal end position of the reference tool. The measurement position acquisition means is configured to measure and store a position of the reference block with the position measurement sensor installed on the main spindle. The length compensation value calculation means is configured to calculate and store a length direction compensation value of the position measurement sensor from the reference tool position acquired in the reference tool position acquisition means, the position of the reference block acquired in the measurement position acquisition means, the relative position acquired in the relative position calculation means, and the length of the reference tool. The diameter compensation value acquisition means is configured to acquire and store a radial direction compensation value of the position measurement sensor with the measured jig. The position compensation means is configured to index the rotation axis to a plurality of any given angles to compensate and store the respective position measurement values of the measured jig measured by the position measurement sensor using the length direction compensation value and the radial direction compensation value. The geometric error identification means is configured to identify the geometric error from the plurality of position measurement values compensated in the position compensation means.

In order to achieve the above-described object, an error identification method according to an eighth aspect of the present invention is provided. The error identification method is used for measuring a position of a measured jig in three-dimensional space, wherein the measured jig is secured on a table by a position measurement sensor installed on a main spindle in the machine tool. The machine tool includes three or more translational axes, one or more rotation axes, the rotatable main spindle to which a tool is to be installed, the table, and a control device configured to control the respective translational axes, rotation axis, and main spindle. The error identification method identifies a geometric error in the machine tool from a value of the measured position (position measurement value). The error identification method uses a tool sensor and a reference block disposed at the tool sensor side. The error identification method executes a tool sensor position acquisition stage, a reference tool measurement position acquisition stage, a position measurement sensor measurement position acquisition stage, a position measurement sensor length calculation stage, a first reference block position acquisition stage, a relative position calculation stage, a reference tool position acquisition stage, a second reference block position acquisition stage, a length compensation value calculation stage, a diameter compensation value acquisition stage, a position measurement stage, a position compensation stage, and a geometric error identification stage. The tool sensor position acquisition stage installs the reference tool for a length reference of the tool to the main spindle and acquire a sensing position of a distal end of the reference tool with the tool sensor. The reference tool measurement position acquisition stage acquires any given tool measurement position with the reference tool installed on the main spindle. The position measurement sensor measurement position acquisition stage acquires any given sensor measurement position with the position measurement sensor installed on the main spindle. The position measurement sensor length calculation stage acquires the difference between the tool measurement position and the sensor measurement position and acquires the length of the position measurement sensor based on the difference and the length of the reference tool. The first reference block position acquisition stage measures a position of the reference block with the position measurement sensor installed on the main spindle. The relative position calculation stage calculates a relative position of the reference block with respect to the sensing position from the sensing position acquired in the tool sensor position acquisition stage, the position of the reference block acquired in the first reference block position acquisition stage, the length of the position measurement sensor calculated in the position measurement sensor length calculation stage, and the length of the reference tool. The reference tool position acquisition stage installs the reference tool on the main spindle and acquires the reference tool position with the tool sensor. The reference tool position is a distal end position of the reference tool. The second reference block position acquisition stage installs the position measurement sensor on the main spindle and measures a position of the reference block with the position measurement sensor. The length compensation value calculation stage calculates a length direction compensation value of the position measurement sensor from the reference tool position acquired in the reference tool position acquisition stage, the position of the reference block measured in the second reference block position acquisition stage, the relative position calculated in the relative position calculation stage, and the length of the reference tool. The diameter compensation value acquisition stage acquires a radial direction compensation value of the position measurement sensor with the measured jig. The position measurement stage indexes the rotation axis to a plurality of any given angles and measures the respective positions of the measured jig by the position measurement sensor. The position compensation stage compensates for the position measurement value at the position measurement stage using the length direction compensation value and the radial direction compensation value. The geometric error identification stage identifies the geometric error from the plurality of position measurement values compensated for in the position compensation stage.

In the error identification method according to a ninth aspect of the present invention, the tool sensor position acquisition stage to the relative position calculation stage is configured to be executed once. The reference tool position acquisition stage to the geometric error identification stage is configured to be executed several times.

In the error identification method according to a tenth aspect of the present invention, the positions measured by the position measurement sensor are the positions of the translational axes when the position measurement sensor senses a contact with a measurement object.

In the error identification method according to an eleventh aspect of the present invention, the positions measured by the tool sensor are the positions of the translational axes when the tool installed on the main spindle moves in the translational axes and the tool sensor senses contact with the tool or passing of the tool.

In the error identification method according to a twelfth aspect of the present invention, the measured jig has a spherical shape.

In the error identification method according to a thirteenth aspect of the present invention, the diameter compensation value acquisition stage measures an initial position of the measured jig by the position measurement sensor. The diameter compensation value acquisition stage acquires the compensation value of the position measurement sensor in a radial direction.

In order to achieve the above-described object, an error identification system according to a fourteenth aspect of the present invention is provided. The error identification system is for measuring the position of a measured jig in three-dimensional space, wherein the measured jig is secured on a table by a position measurement sensor installed on a main spindle in a machine tool. The machine tool includes three or more translational axes, one or more rotation axes, the rotatable main spindle to which the tool is to be installed, the table, and a control device configured to control the respective translational axes, rotation axis, and main spindle. The error identification system identifies the geometric error in the machine tool from a value of the measured position (position measurement value). The error identification system includes a reference tool, a tool sensor, a reference block, tool sensor position acquisition means, reference tool measurement position acquisition means, position measurement sensor measurement position acquisition means, position measurement sensor length calculation means, first reference block position acquisition means, relative position calculation means, reference tool position acquisition means, second reference block position acquisition means, length compensation value calculation means, diameter compensation value acquisition means, position compensation means, and geometric error identification means. The reference tool is for a length reference of the tool. The tool sensor is configured to detect the distal end position of the reference tool installed on the main spindle. The reference block is installed on the tool sensor side. The tool sensor position acquisition means is configured to move the reference tool installed on the main spindle in the translational axes and acquire and store the sensing position of the distal end of the reference tool with the tool sensor. The reference tool measurement position acquisition means is configured to acquire and store any given tool measurement position with the reference tool installed on the main spindle. The position measurement sensor measurement position acquisition means is configured to acquire and store any given sensor measurement position with the position measurement sensor installed on the main spindle. The position measurement sensor length calculation means is configured to acquire the difference between the tool measurement position and the sensor measurement position. The position measurement sensor length calculation means is configured to calculate and store the length of the position measurement sensor based on the difference and the length of the reference tool. The first reference block position acquisition means is configured to measure and store the position of the reference block with the position measurement sensor installed on the main spindle. The relative position calculation means is configured to calculate and store a relative position of the reference block with respect to the sensing position from the sensing position acquired in the tool sensor position acquisition means, the position of the reference block acquired in the first reference block position acquisition means, the length of the position measurement sensor calculated in the position measurement sensor length calculation means, and the length of the reference tool. The reference tool position acquisition means is configured to move the reference tool installed on the main spindle in the translational axes. The reference tool position acquisition means is configured to acquire and store the reference tool position with the tool sensor. The reference tool position is the distal end position of the reference tool. The second reference block position acquisition means is configured to measure and store the position of the reference block with the position measurement sensor installed on the main spindle. The length compensation value calculation means is configured to calculate and store the length direction compensation value of the position measurement sensor from the reference tool position acquired in the reference tool position acquisition means, the position of the reference block acquired in the second reference block position acquisition means, the relative position calculated in the relative position calculation means, and the length of the reference tool. The diameter compensation value acquisition means is configured to acquire and store a radial direction compensation value of the position measurement sensor with the measured jig. The position compensation means is configured to index the rotation axis to a plurality of given angles and compensate and store the respective position measurement values of the measured jig measured by the position measurement sensor using the length direction compensation value and the radial direction compensation value. The geometric error identification means is configured to identify the geometric error from the plurality of position measurement values compensated in the position compensation means.

According to the present invention, calibration of the length and diameter compensation values of the position measurement sensor is possible during the sequence of respective measurements for the geometric error identification. The need for manual work, except for the preparation work in advance, is eliminated. Accordingly, the preparation of an additional jig or a similar preparation is not required, ensuring a reduction in the load of a machine operator and ensuring reliable performance of the calibration of the position measurement sensor at the geometric error identification. This does not deteriorate the measurement accuracy of the position measurement sensor, even if the state of the position measurement sensor changes due to heat displacement, ensuring highly accurate identification of the geometric error in the machine tool.

Further, the measurement system with the CCD camera or a similar system is not required, thus achieving a comparatively low price.

DETAILED DESCRIPTION OF THE INVENTION

The following describes embodiments of the present invention based on the drawings.

As described above, FIG. 1 is a schematic diagram of a machining center, which is one configuration of a machine tool that includes three translational axes orthogonal to one another and two rotation axes orthogonal to one another. A motion having two degrees of freedom for the translation of the main spindle 2 in the X-axis and the Z-axis directions, which are the translational axes and are orthogonal to one another, is possible with respect to the bed 1. A motion having one degree of freedom for the rotation of the table 3 in the C-axis direction, which is the rotation axis, is possible with respect to the cradle 4. A motion having one degree of freedom for the rotation of the cradle 4 in the A-axis direction, which is the rotation axis orthogonal to the C-axis direction, is possible with respect to the trunnion 5. A motion having one degree of freedom for the translation of the trunnion 5 in the Y-axis direction, which is the translational axis and orthogonal to the X-axis and Z-axis directions, is possible with respect to the bed 1. Accordingly, the motions of the three degrees of freedom of translation and the two degrees of freedom of rotation of the main spindle 2 are possible with respect to the table 3. Servo motors, which are controlled by a numerical control unit (not illustrated), drive respective feed axes. A workpiece is secured to the table 3, a tool is installed on the main spindle 2 and rotated, and the relative position and the relative posture between the workpiece and the tool are controlled, thus ensuring the processes of the workpiece.

The machine according to the present invention is not limited to the machining center described above, and may be a machine tool such as a lathe, a multitasking machine, and a grinder. The number of axes is not limited to five axes, but may be four axes or six axes, for example. Further, the mechanism is not limited to one where the table 3 has two degrees of freedom for the rotation or more in the rotation axes, but can also be a mechanism where the main spindle 2 has two degrees of freedom for the rotation or more and a mechanism where the main spindle 2 and the table 3 each have one degree of freedom for the rotation or more may be employed.

Figure 2:
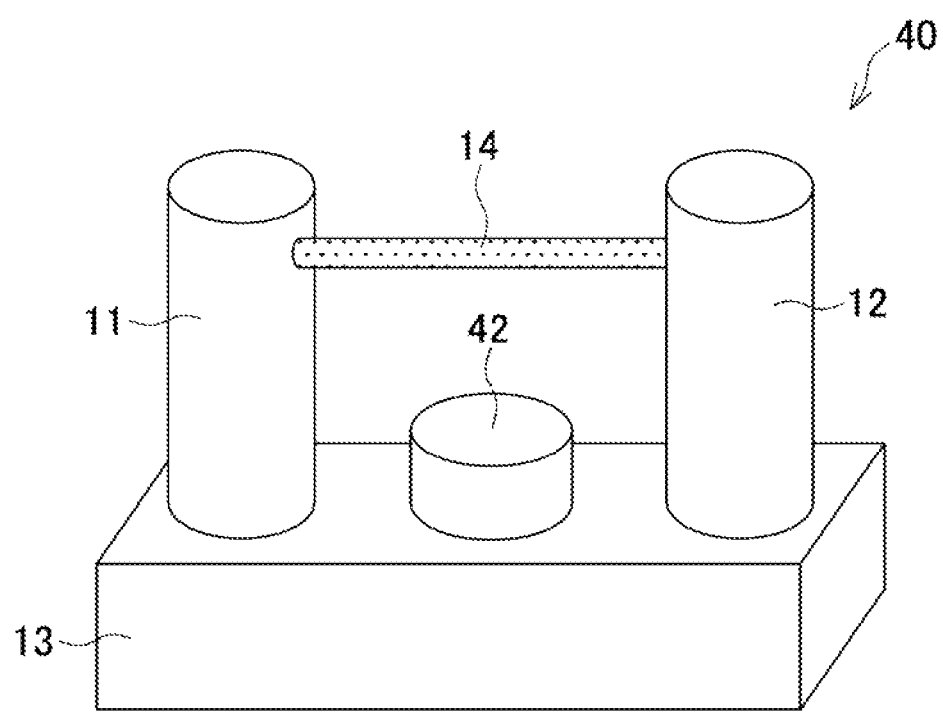
FIG. 2 is a schematic diagram illustrating one example of a laser sensor.
Figure 3:
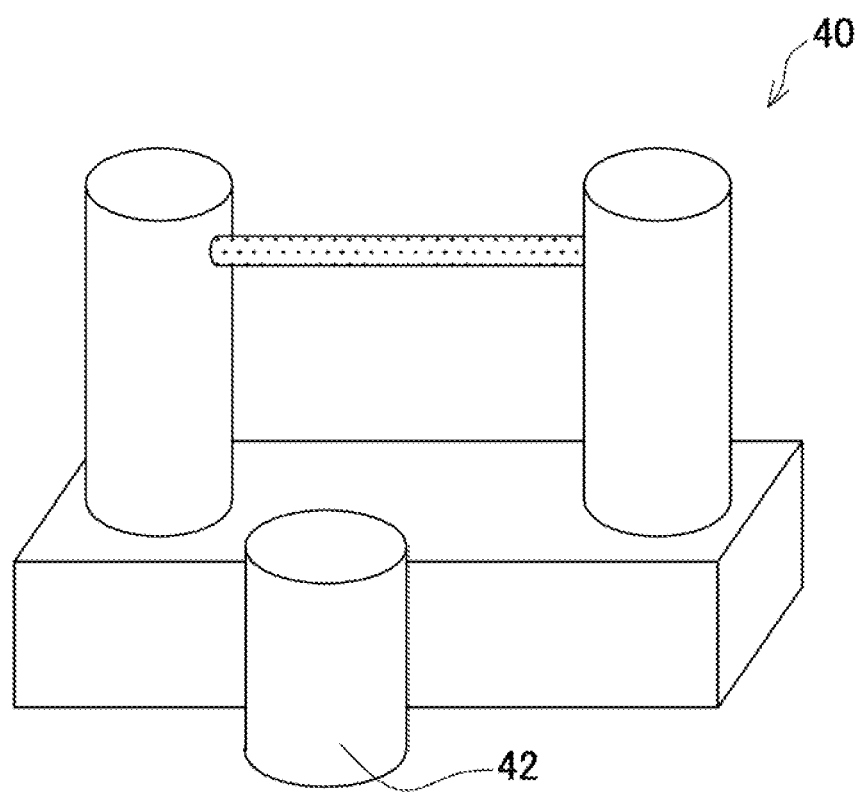
FIG. 3 is a schematic diagram illustrating a modification example of the laser sensor.

FIG. 2 is a schematic diagram of a laser sensor 40 as one example of a tool sensor of the present invention. The laser sensor 40 includes a light emitting portion 11, a light receiving portion 12, and a base portion 13. The laser sensor 40 also includes a reference block 42 between the light emitting portion 11 and the light receiving portion 12. The light emitting portion 11, the light receiving portion 12, and the reference block 42 are each secured to the base portion 13. Note that, as illustrated in FIG. 3, the reference block 42 may be separately disposed near the laser sensor 40.

Figure 1:
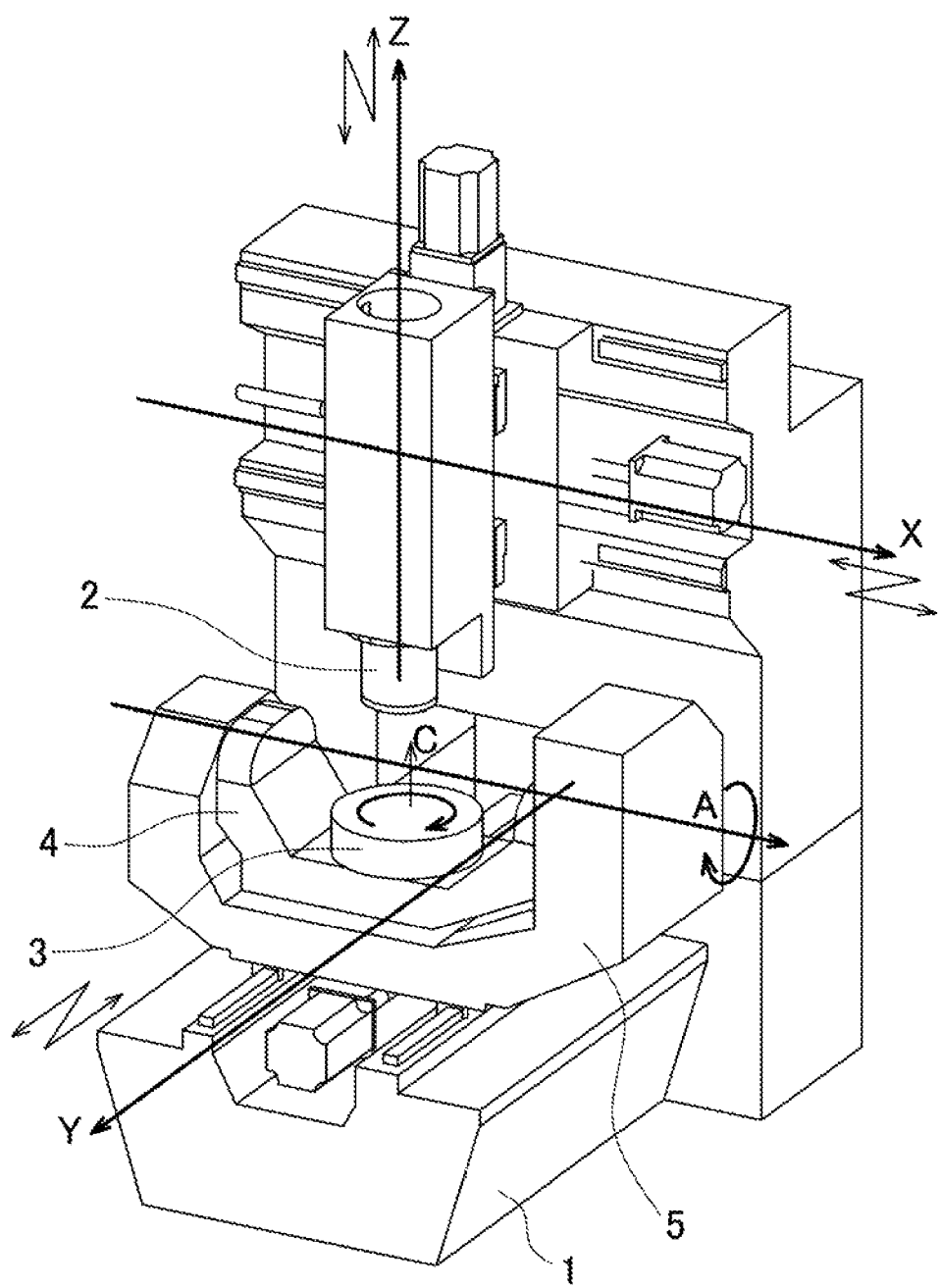
FIG. 1 is a schematic diagram of a machining center.
Figure 4:
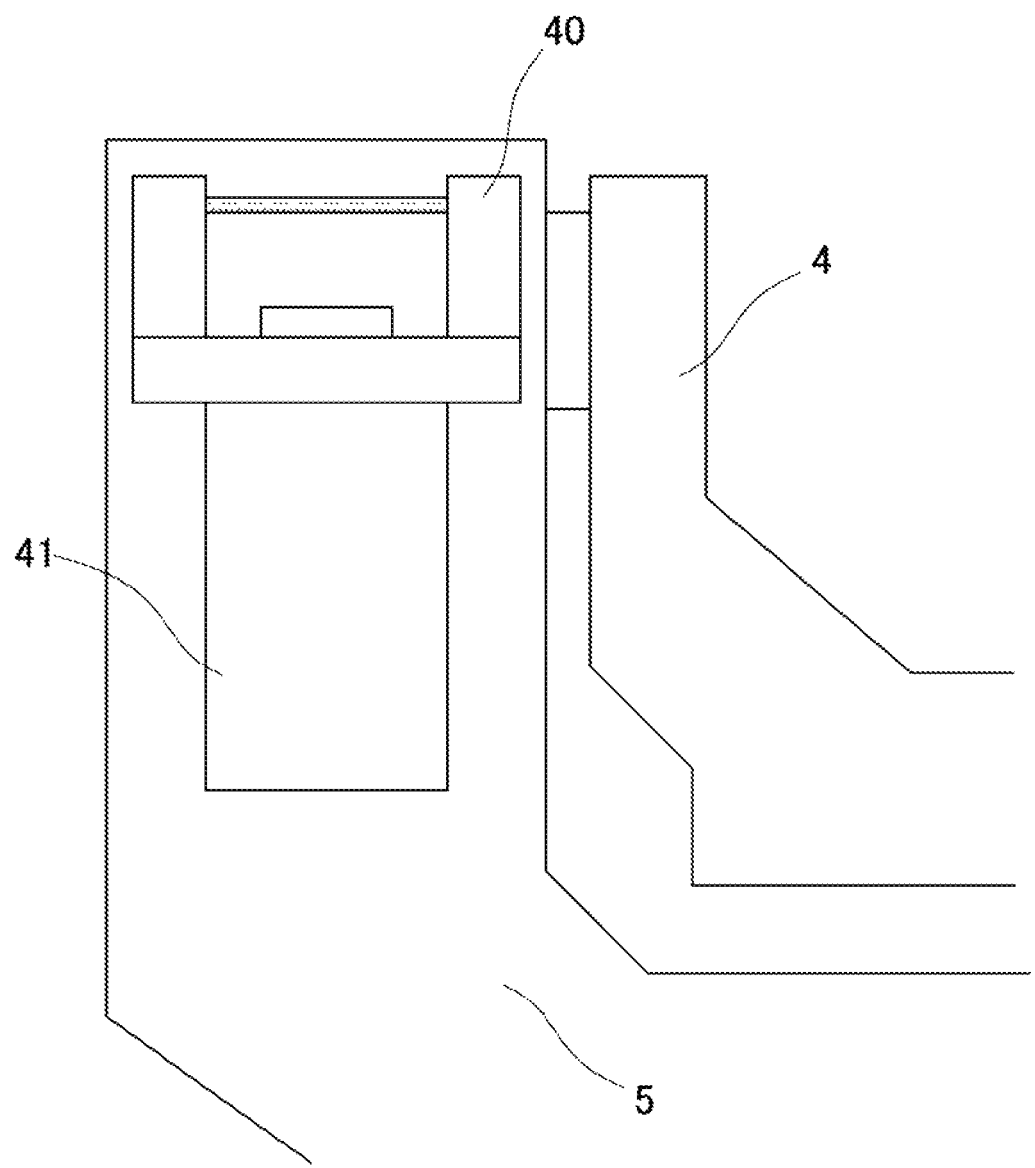
FIG. 4 is a schematic diagram of the laser sensor of the present invention mounted to the machining center.

As illustrated in FIG. 4, the laser sensor 40 is mounted to the trunnion 5 of the machining center in FIG. 1 via the sensor mounting block 41.

With the laser sensor 40, the light emitting portion 11 outputs laser light 14, and the light receiving portion 12 receives the laser light 14. When the laser light 14 is obstructed by a substance, and therefore a light-receiving rate becomes a certain rate or less, the laser sensor 40 generates a signal. A control device (not illustrated) receives this signal and determines the positions of the feed axes at the time point of the reception of the signal or at the time point considering the delay as measurement values. For example, the tool is mounted on the main spindle 2 and is caused to approach the laser light in the Z-axis direction to acquire the Z-axis position Zt at a time point when the tool cuts off the laser light. The Z-axis position Zb of the reference tool is similarly acquired. The length of the tool with respect to the reference tool is acquired from the difference between Zt and Zb. Substractions of the length Td of the reference tool as well acquires an absolute length of the tool.

Figure 5:
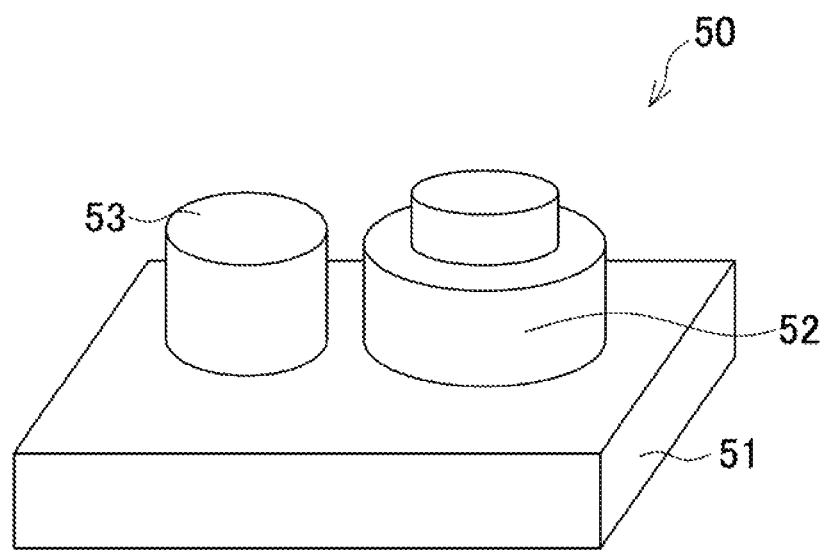
FIG. 5 is a schematic diagram illustrating one example of a touch sensor.
Figure 6:
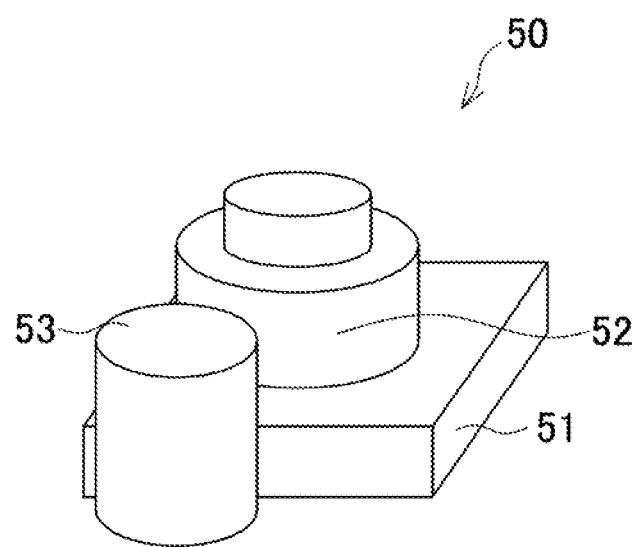
FIG. 6 is a schematic diagram illustrating a modification example of the touch sensor.

FIG. 5 is a schematic diagram of a touch sensor 50 as one example of the tool sensor of the present invention. The touch sensor 50 includes a base portion 51, a touch sensor portion 52, and a reference block 53. The touch sensor portion 52 and the reference block 53 are secured on the base portion 51. The touch sensor 50 is mounted to the trunnion 5 of the machining center in FIG. 1 similar to the laser sensor 40. As illustrated in FIG. 6, the reference block 53 is separately disposed near the touch sensor 50.

The following describes an error identification method and an error identification system in the case of using the laser sensor 40 as the tool sensor. It should be noted that the case of the use of the touch sensor 50 differs only in a sensing method and is substantially identical.

Figure 7:
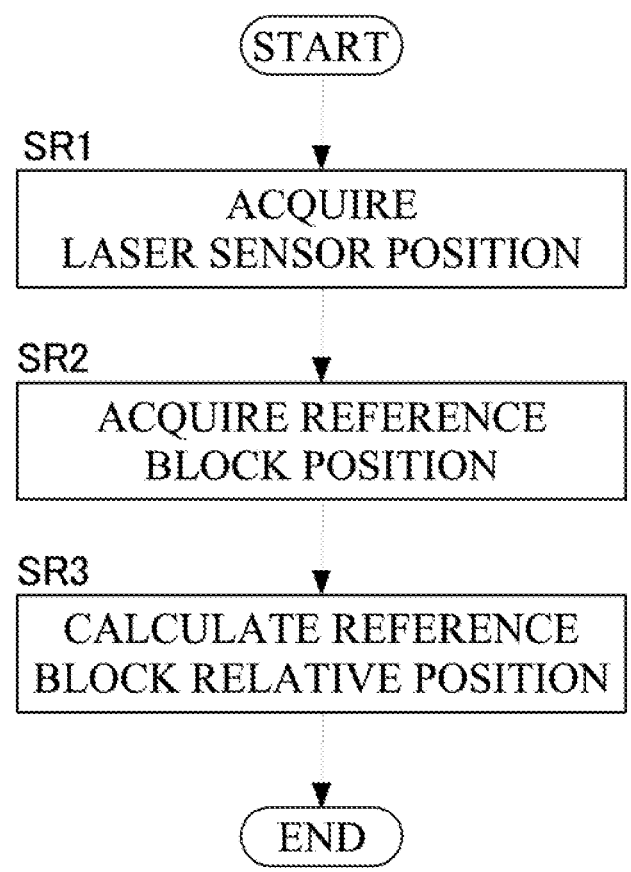
FIG. 7 is a flowchart for measurement preparation work.

First, the procedure for measurement preparation work is described based on the flowchart in FIG. 7. The measurement preparation work needs to be performed in advance before the measurement of a target ball (measured jig) and geometric error identification by a touch trigger probe as a position measurement sensor are made, which will be described later. It is only necessary to perform the measurement preparation work at a low frequency in the cases such as the deterioration of the laser sensor and equipment exchange due to failure of the laser sensor.

Figure 8:
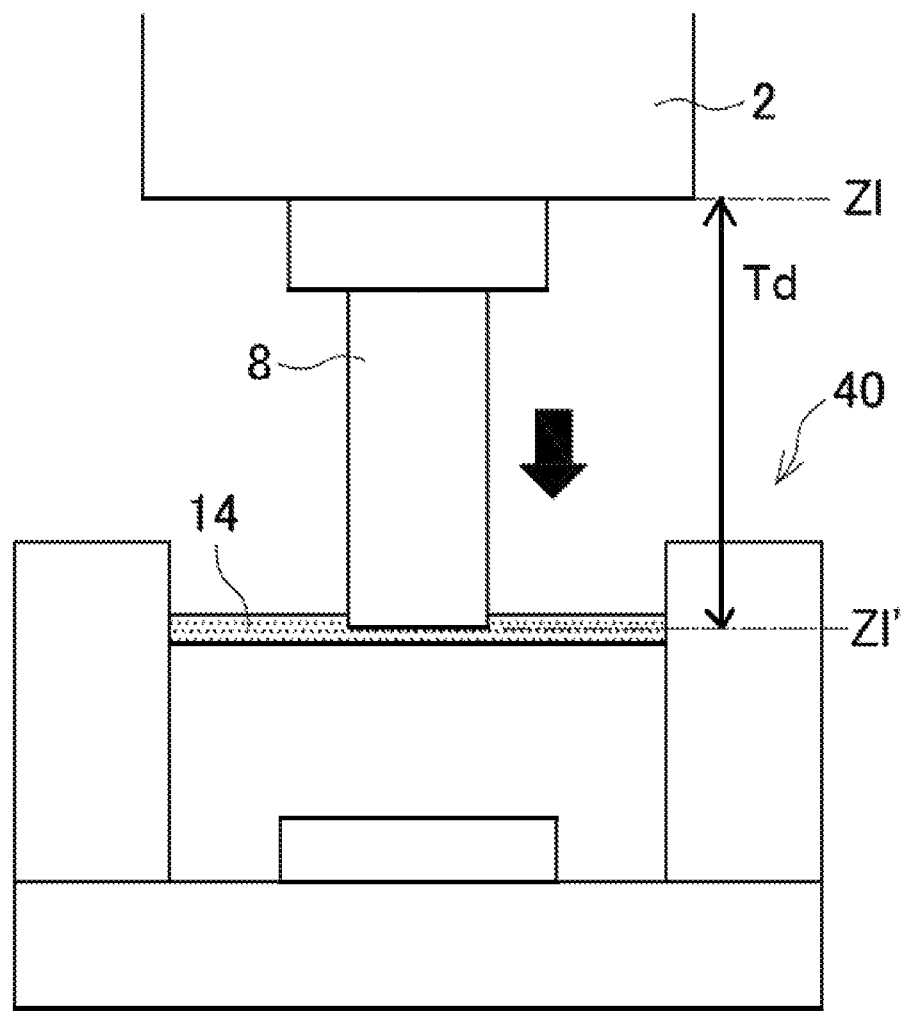
FIG. 8 is an explanatory view for Step SR1 in the measurement preparation work.

At Step SR1, as illustrated in FIG. 8, a reference tool 8 is installed on the main spindle 2 and is measured by the laser sensor 40. Here, the Z-axis is moved such that the reference tool 8 approaches the laser light 14 and the Z-axis position at a time point when the distal end of the reference tool 8 cuts off the laser light 14 and the light-receiving rate is the threshold, or a time point considering the signal delay is acquired. A storage unit (not illustrated) in the control device stores the acquired Z-axis position Zl (a tool sensor position acquisition stage and tool sensor position acquisition means. Here, the control device functions as means that performs respective stages of the disclosure). The storage unit also preliminarily stores the length Td of the reference tool 8. Here, the reference tool distal end position Zl' is calculated from Zl and Td (=Zl−Td) and stored.

Figure 9:
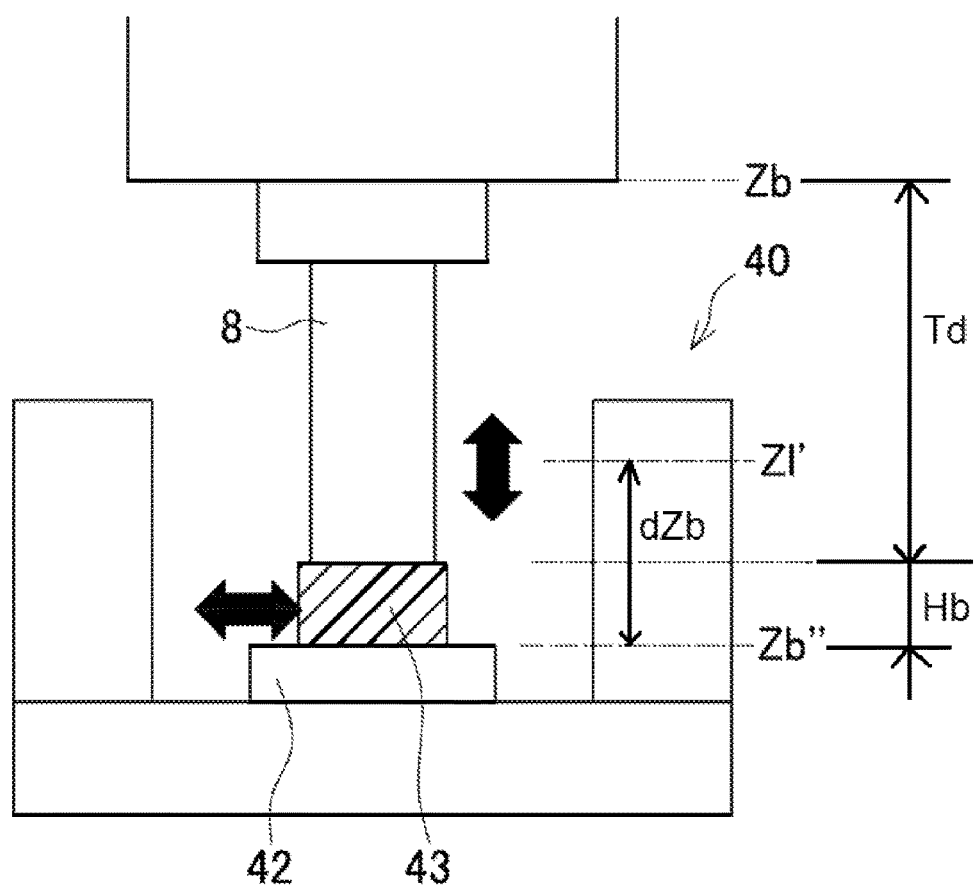
FIG. 9 is an explanatory view for Step SR2 in the measurement preparation work.

Next, at Step SR2, the position of the reference block 42 is acquired using the reference tool 8. Here, as illustrated in FIG. 9, with the reference tool 8 installed on the main spindle 2, the reference tool 8 is brought into contact with the reference block 42 via the block gauge 43 to acquire the Z-axis position Zb at the time. The storage unit (not illustrated) in the control device stores a value Zb' found by subtracting the thickness Hb of the block gauge 43 (=Zb−Hb) (a reference block position acquisition stage and reference block position acquisition means). Here, the reference block top surface position Zb" may be calculated and stored also using Td (=Zb−Hb−Td). The block gauge 43 may be a block with an already-known thickness dimension or a similar block.

Figure 10:
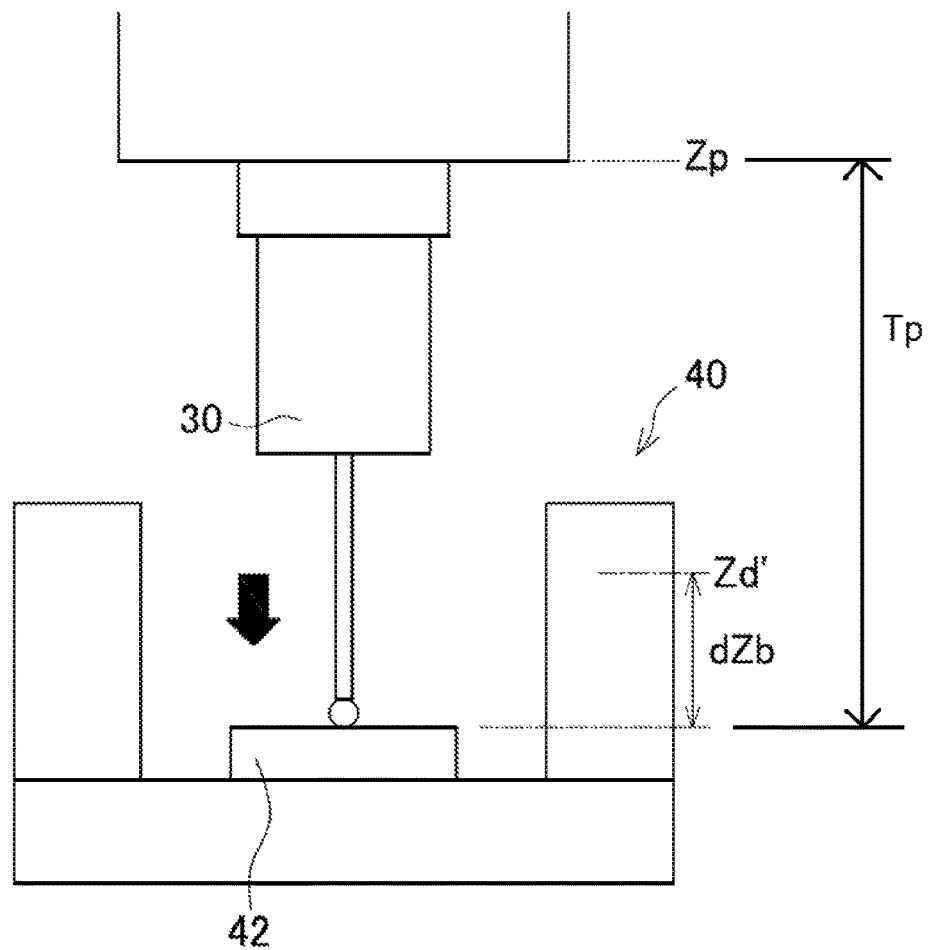
FIG. 10 is an explanatory view for Step S1-2 for an error identification method of the present invention.

At Step SR3, as shown in FIG. 10, a relative position dZb (=Zl−Zb') of the reference block 42 with respect to a sensing position of the laser sensor 40 is calculated from the Z-axis position Zl, which is stored at Step SR1, and the Z-axis position Zb', which is stored at Step SR2, and is stored in the storage unit in the control device (a relative position calculation stage and relative position calculation means). Here, the storage unit also stores the block gauge thickness Hb, and dZb may be calculated from Zl, Zb, and Hb (dZb=Zl−Zb−Hb). Note that, the storage of Zl' and Zb'' values allows the calculation of dZb=Zl'−Zb''.

Figure 11:
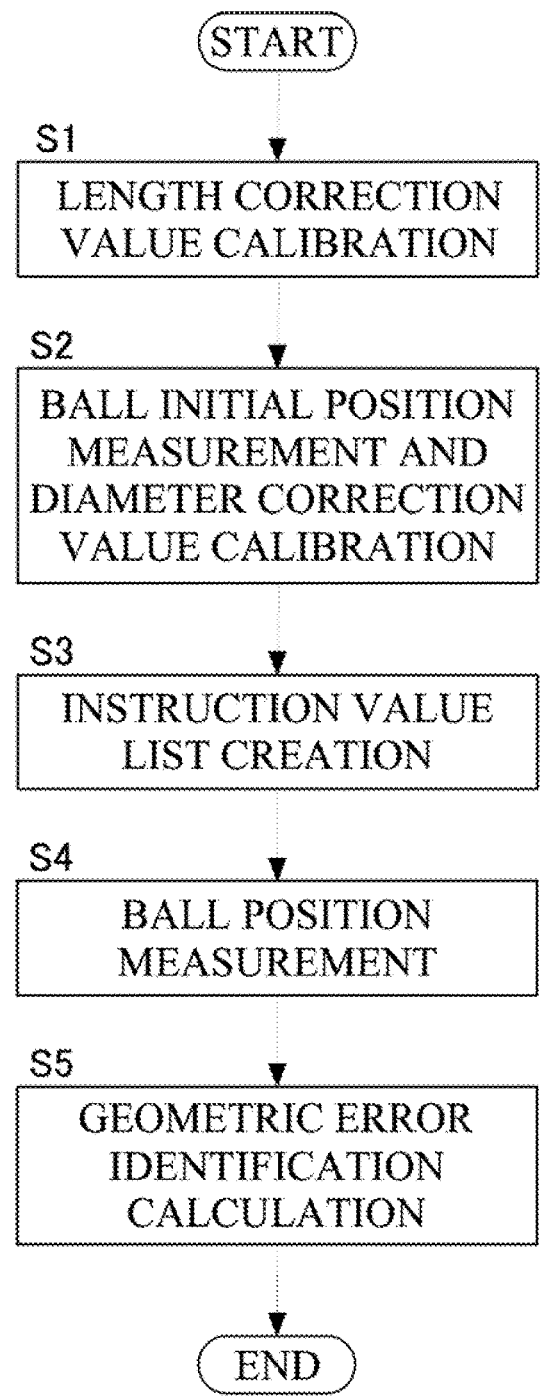
FIG. 11 is a flowchart for the error identification method of the present invention.

The following describes a procedure of the geometric error identification of the disclosure based on a flowchart in FIG. 11.

First, at Step S1, the calibration of the length compensation value of the touch trigger probe 30 is performed. The details are described later.

Figure 12:
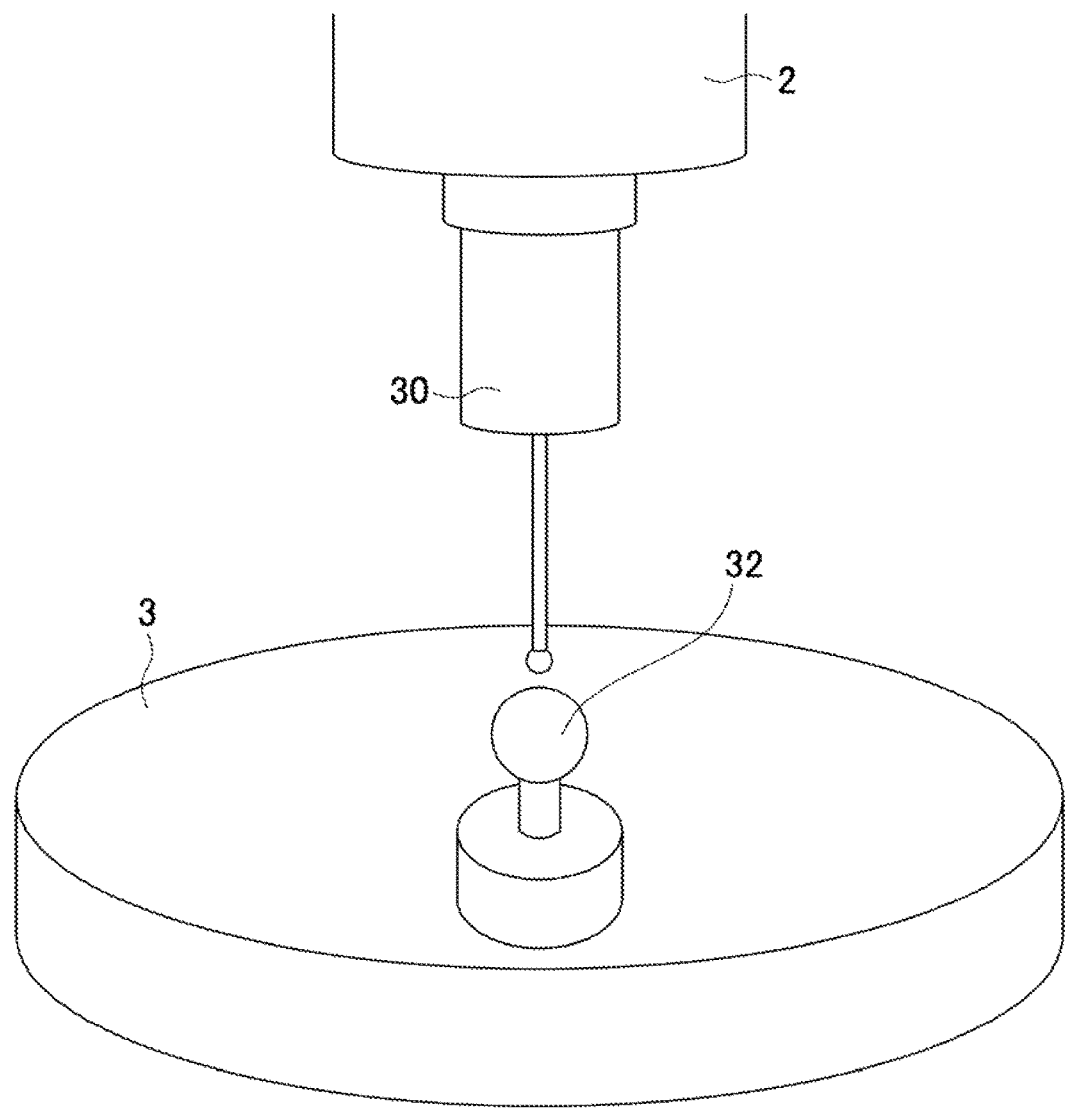
FIG. 12 is a schematic diagram of a touch trigger probe and a target ball.

Next, at Step S2, as illustrated in FIG. 12, the initial position of the target ball 32 secured on the table 3 is measured. A diameter compensation value calibration of the touch trigger probe 30 is performed with the target ball 32 (the diameter compensation value acquisition stage and the diameter compensation value acquisition means). The details are described later.

At Step S3, the respective expected center positions of the target ball and the touch trigger probe distal end positions, after a movement by a rotation and an inclination of the rotation axes under preset measurement conditions (such as index angles of the respective rotation axes), are calculated using the target ball initial position measured at Step S2 and the length of the touch trigger probe 30 (length compensation value) (the position measurement stage and position compensation means).

Furthermore, three-dimensional position coordinate values calculated in the respective index angles are set as instruction values of the respective X-, Y-, and Z-axes. An instruction value list that sets the respective index angles as the instruction values of the rotation axes is created.

At Step S4, the touch trigger probe 30 is brought into contact with a surface of the target ball 32 at four points or more on the basis of the respective feed axis instruction values in the instruction value list created at Step S3. Compensation is performed using the length compensation value acquired at Step S1 and the diameter compensation value acquired at Step S2 to acquire the center position and the diameter of the target ball 32 (a position compensation stage and position compensation means). Here, the use of a diameter calibration value of the target ball 32 preliminarily measured by a coordinate measuring machine or a similar machine allows acquiring the center position of the target ball 32 through the measurement at the three-point contact.

At Step S5, the identification calculation of the geometric error in the machine is performed on the basis of the acquired center position coordinate values of the target ball 32 and the instruction values at the respective positions (the geometric error identification stage and geometric error identification means). The details will be described later.

Figure 13:
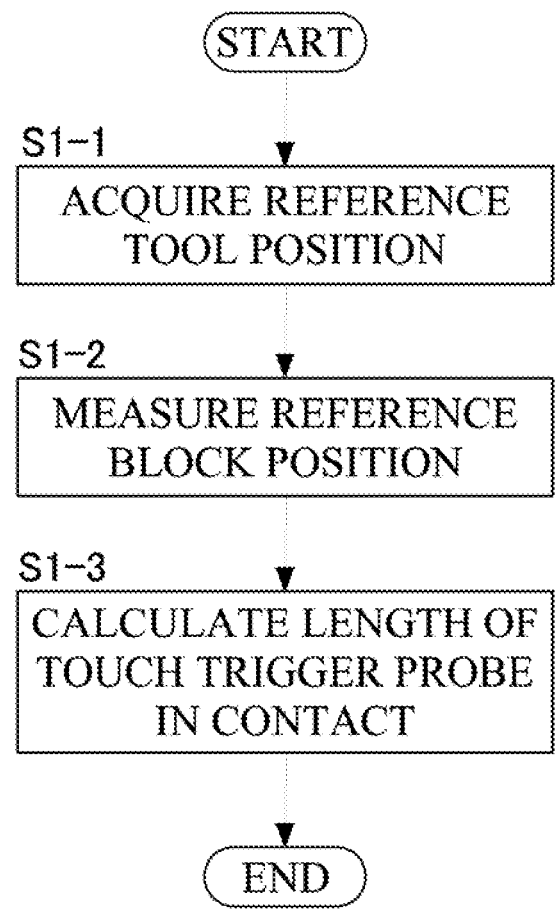
FIG. 13 is a flowchart for S1 in the error identification method of the present invention.

The following describes the length compensation value calibration at Step S1 based on the flowchart in FIG. 13.

First, at Step S1-1, similar to Step SR1 described in connection with FIG. 8, the reference tool 8 is installed on the main spindle 2, and the laser sensor 40 performs the measurement. The storage unit in the control device (not illustrated) stores a Z-axis position Zd (the reference tool position acquisition stage and reference tool position acquisition means). Using Td, Zd'=Zd−Td may be stored.

Next, at Step S1-2, as illustrated in FIG. 10, the touch trigger probe 30 is installed on the main spindle 2 to measure the reference block 42 by the touch trigger probe 30. Here, the Z-axis is moved such that the touch trigger probe 30 approaches the reference block 42, and the Z-axis position Zp is acquires at a time point when the stylus at a distal end of the touch trigger probe 30 contacts the reference block 42 and the touch trigger probe 30 transmits the trigger signal or a time point considers the signal delay. The storage unit in the control device (not illustrated) stores the acquired Z-axis position Zp (the position measurement sensor measurement stage and measurement position acquisition means).

At Step S1-3, the length of the touch trigger probe 30 in contact, which is the length direction compensation value of the touch trigger probe 30, is calculated. That is, the length direction compensation value (length in contact) Tp (=Zp−Zd+dZb+Td) is acquired from Zd stored at Step S1-1, Zp stored at Step S1-2, and the relative position dZb of the reference block 42 and the reference tool length Td, which are stored in the storage unit in the control device. The storage unit stores the length direction compensation value Tp (a length compensation value calculation stage and length compensation value calculation means). Here, Tp (=Zp−Zd'−dZb) may be acquired from Zd', Zp, and dZb.

Figure 14:
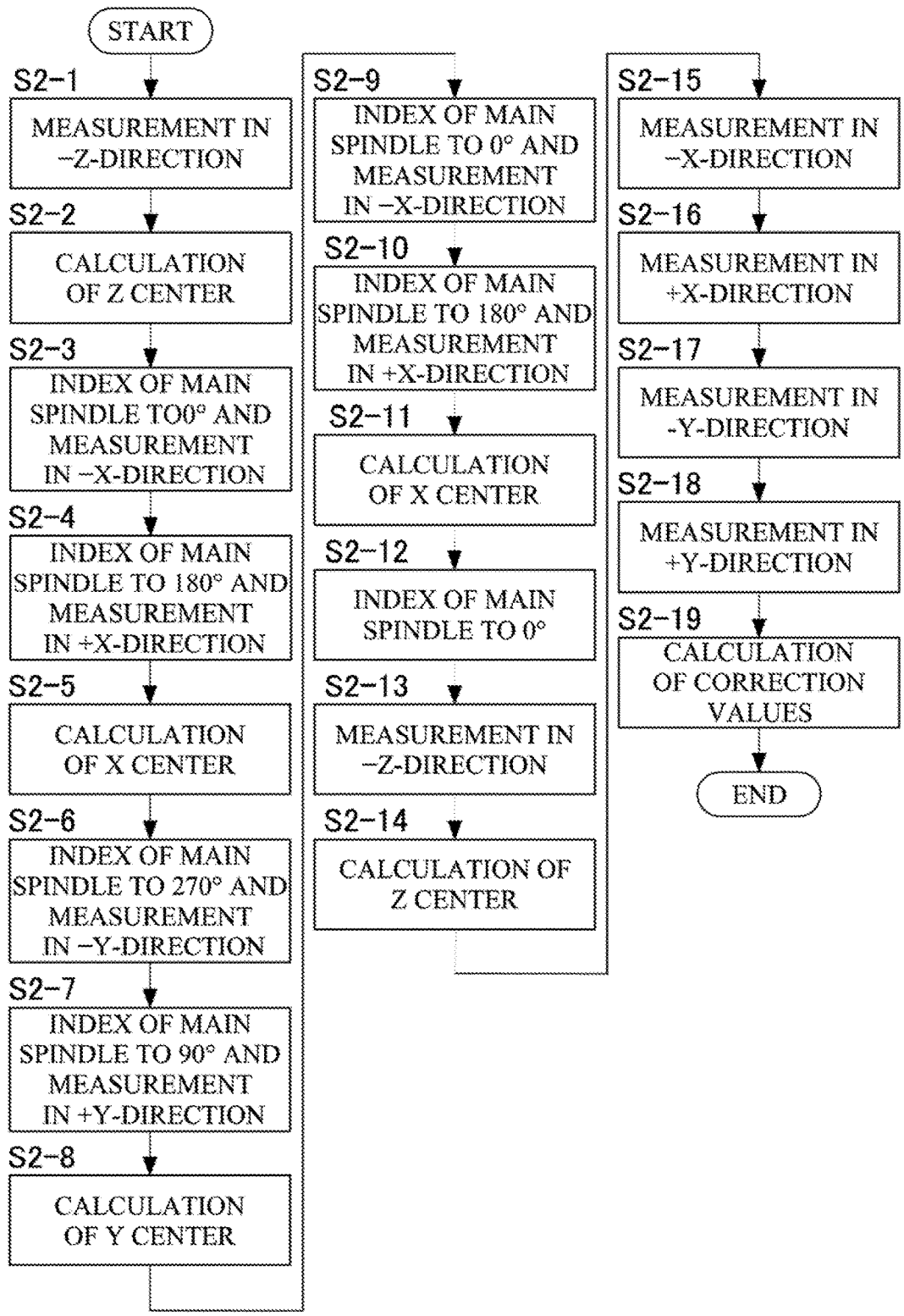
FIG. 14 is a flowchart for S2 in the error identification method of the present invention.

The following describes details of Step S2 based on the flowchart in FIG. 14.

First, before executing Step S2, as illustrated in FIG. 12, the touch trigger probe 30 with the stylus ball at the distal end is mounted on the main spindle 2 of the five-axis-control machining center, and the target ball 32 is installed and secured on the table 3.

At Step S2-1, the touch trigger probe 30 is moved in the −Z-direction to bring the touch trigger probe 30 into contact with a site near an apex in the +Z-direction of the target ball 32, and a Z-axis coordinate value zm1 in contact is stored.

Next, at Step S2-2, a temporary Z-center position zt is acquired from the following formula 1 using a diameter d0 of the target ball 32 preliminarily measured by the coordinate measuring machine or a similar machine and a preliminarily acquired touch trigger probe diameter compensation value t1:

$$zt = zm1 - d0/2 - t1. \quad \text{Formula 1}$$

At Step S2-3, the main spindle 2 is indexed to 0°, and the touch trigger probe 30 is moved to a site near the apex on the +X-side of the target ball 32. After that, the touch trigger probe 30 is moved in the −X-direction to bring the touch trigger probe 30 into contact with a site near the apex on the +X-side of the target ball 32, and an X-axis coordinate value xm1 in contact is stored.

At Step S2-4, the main spindle 2 is indexed to 180° such that the touch trigger probe 30 contacts the target ball 32 at a point identical to the point on the stylus ball in contact at Step S2-3. After the touch trigger probe 30 is moved to the site near the apex on the −X-side of the target ball 32, the touch trigger probe 30 is moved in the +X-direction to bring the touch trigger probe 30 into contact with the site near the apex on the −X-side of the target ball 32, and an X-axis coordinate value xp1 in contact in stored.

At Step S2-5, an X-center position xo is acquired from the following formula 2 using the stored xm1 and xp1:

$$xo = (xp1 + xm1)/2. \quad \text{Formula 2}$$

Figure 15:
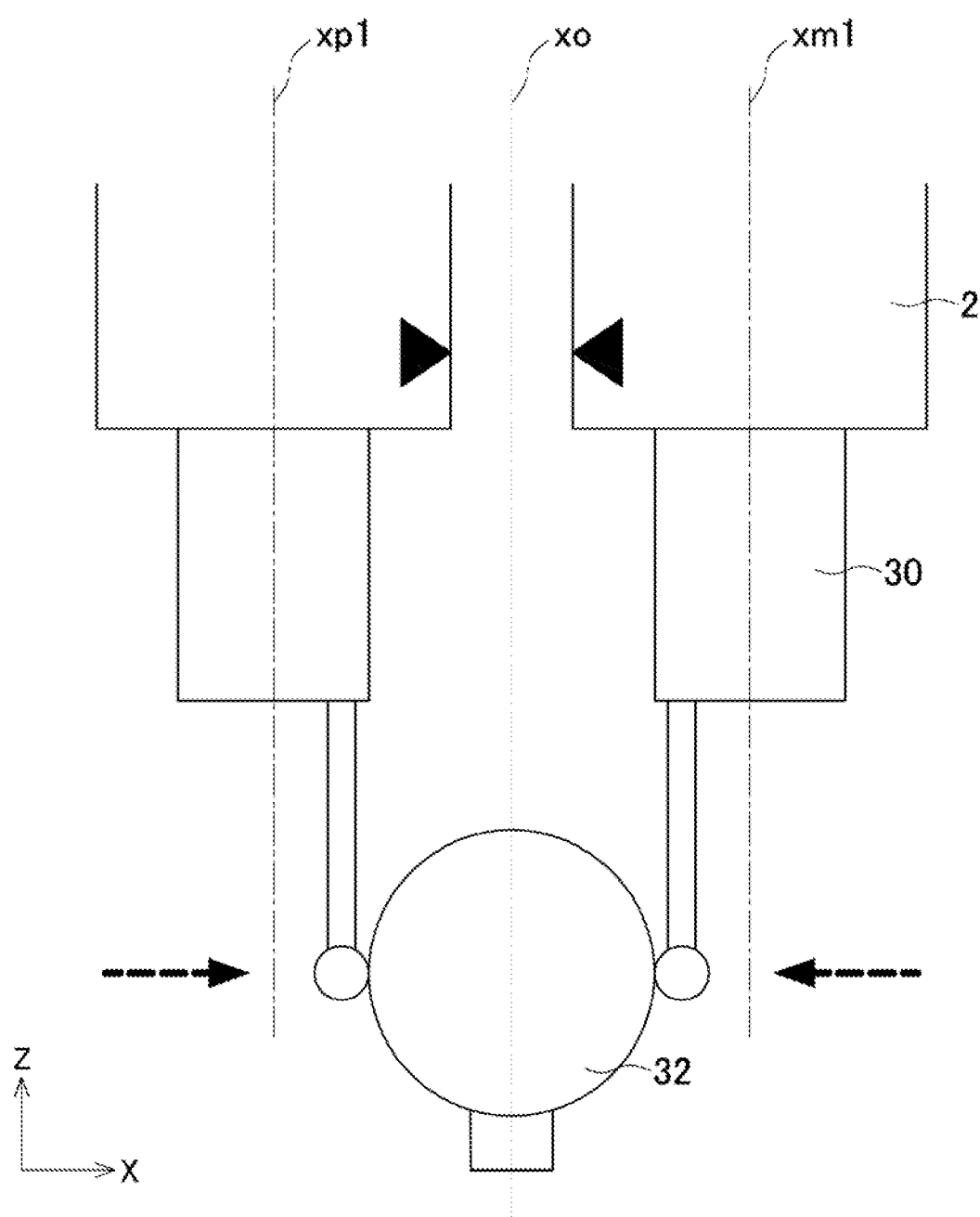
FIG. 15 is a schematic diagram of a relationship between a measurement value at an initial position measurement of the target ball of the present invention and a sphere center.

At Step S2-3 and Step S2-4, as illustrated in FIG. 15, the touch trigger probe 30 contacts the target ball 32 at the identical point on the stylus ball of the touch trigger probe 30. This ensures accurately acquiring xo without being affected by the property difference due to the difference in the contact direction of the touch trigger probe 30 and the swing of the touch trigger probe 30 and the main spindle 2.

At Step S2-6, similar to the above-described operations, the main spindle 2 is indexed to 270° and the touch trigger probe 30 is moved to the site near the apex on the +Y-side of the target ball 32. After that, the touch trigger probe 30 is moved in the −Y-direction to bring the touch trigger probe 30 into contact with the site near the apex on the +Y-side of the target ball 32, and a Y-axis coordinate value ym1 in contact is stored.

At Step S2-7, similar to the above-described operations, the main spindle 2 is indexed to 90° and the touch trigger probe 30 is moved to the site near the apex on the −Y-side of the target ball 32. After that, the touch trigger probe 30 is moved in the +Y-direction to bring the touch trigger probe 30 into contact with the site near the apex on the −Y-side of the target ball 32, and a Y-axis coordinate value yp1 in contact is stored.

At Step S2-8, a Y-center position yo is acquired from the following formula 3 using the stored ym1 and yp1:

$$yo=(yp1+ym1)/2. \quad \text{Formula 3}$$

At Step S2-9, similar to Step S2-3, the main spindle 2 is indexed to 0°. The apex on the +X-side of the target ball 32 is measured to update the X-axis coordinate value xm1.

At Step S2-10, similar to Step S2-4, the main spindle 2 is indexed to 180°. The apex on the −X-side of the target ball 32 is measured to update the X-axis coordinate value xp1.

At Step S2-11, the X-center position xo is calculated again from the formula 2 using the updated xm1 and xp1.

At Step S2-12, the main spindle 2 is indexed to 0° (an angle indexed at the usual measurement).

At Step S2-13, the touch trigger probe 30 is positioned at the X-coordinate xo, the Y-coordinate yo, and the right above the apex of the target ball 32 in the Z-axis direction. The touch trigger probe 30 in moved in the −Z-direction to bring the touch trigger probe 30 into contact with a site near the apex in the positive direction of +Z of the target ball 32 and a Z-axis coordinate value zm2 in contact is stored.

At Step S2-14, a Z-center position zo is acquired from the following formula 4:

$$zo=zm2-d0/2-t1. \quad \text{Formula 4}$$

At Step S2-15, the touch trigger probe 30 is moved to the site near the apex on the +X-side of the target ball 32. After that, the touch trigger probe 30 is moved in the −X-direction to bring the touch trigger probe 30 into contact with the site near the apex on the +X-side of the target ball 32, and an X-axis coordinate value xm2 in contact is stored.

At Step S2-16, the touch trigger probe 30 is moved to the site near the apex on the −X-side of the target ball 32. After that, the touch trigger probe 30 is moved in the +X-direction to bring the touch trigger probe 30 into contact with the site near the apex on the −X-side of the target ball 32, and an X-axis coordinate value xp2 in contact is stored.

At Step S2-17, the touch trigger probe 30 is moved to the site near the apex on the +Y-side of the target ball 32. After that, the touch trigger probe 30 is moved in the −Y-direction to bring the touch trigger probe 30 into contact with the site near the apex on the +Y-side of the target ball 32, and a Y-axis coordinate value ym2 in contact is stored.

At Step S2-18, the touch trigger probe 30 is moved to the site near the apex on the −Y-side of the target ball 32. After that, the touch trigger probe 30 is moved in the +Y-direction to bring the touch trigger probe 30 into contact with the site near the apex on the −Y-side of the target ball 32, and a Y-axis coordinate value yp2 in contact is stored.

Figure 16:
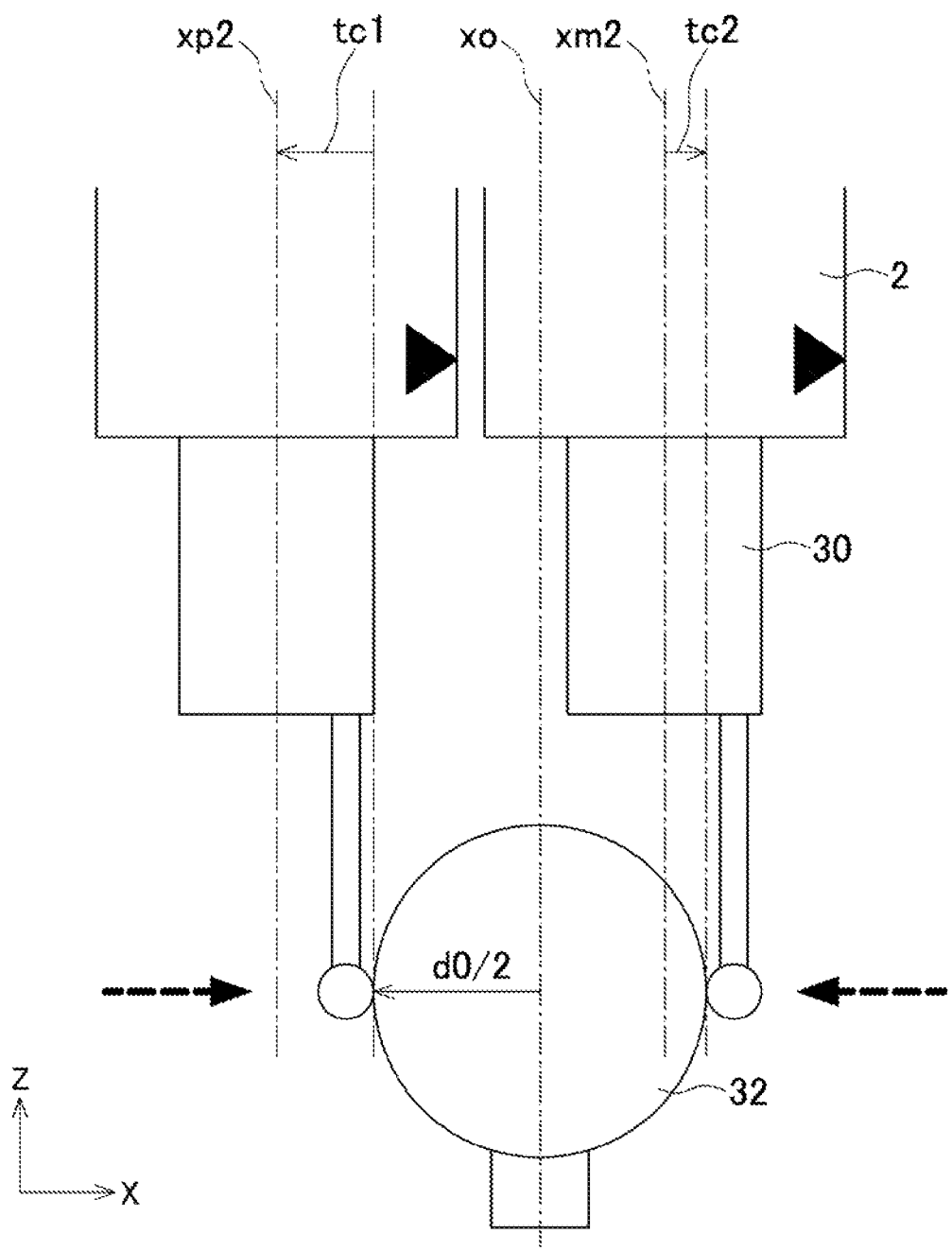
FIG. 16 is a schematic diagram of a relationship between the measurement values and touch trigger probe diameter compensation values at the initial position measurement of the target ball of the present invention.

At Step S2-19, contact touch trigger probe diameter compensation values tc1, tc2, tc3, and tc4 in the +X, −X, +Y, and −Y-directions are acquired using the following formula 5. Here, the main spindle center when the target ball 32 is positioned at the position (xo, yo) matches the target ball center. Therefore, as illustrated in FIG. 16, the respective compensation values can be acquired from a movement distance from the center position and the target ball diameter.

$$tc=xo-xp2-d0/2;$$

$$tc2=xo-xm2+d0/2;$$

$$tc3=yo-yp2-d0/2; \text{ and}$$

$$tc4=yo-ym2+d0/2. \quad \text{Formula 5:}$$

As described above, at Step S2, the center position (xo, yo, zo) of the target ball 32 is measured together with the acquisition of the touch trigger probe diameter compensation values tc1, tc2, tc3, and tc4.

The touch trigger probe is moved toward the center of the target ball 32, such that the touch trigger probe is brought into contact with the target ball 32. Assume that the measurement values of the respective axes at any given point on the surface of the target ball 32 as (xs, ys, zs). Then, the following formula 6 can also be used to acquire touch trigger probe compensation values (tax, tay, taz) at the any given point.

$$tax=xo-xs-d0/2;$$

$$tay=yo-ys+d0/2; \text{ and}$$

$$taz=zo-zs+d0/2. \quad \text{Formula 6:}$$

Next, the following describes details of Step S5.

In one measurement condition, one of the rotation axes is secured and the other is indexed to a plurality of angles, and the center position of the target ball is measured. Difference vectors of the measurement values at the ball center position with respect to the instruction values under the measurement condition can be distributed to radial direction, axial direction, and tangent direction components of an index axis. These respective components can be approximated as Fourier series of a zero-order component (radius error), a first-order component (a center deviation), and a second-order component (elliptical shape), namely, an arc with error by, for example, least-square method.

A radial direction component $dRr_i$, an axial direction component $dRa_i$, and a radial direction component $dRt_i$ of the measurement values at a k-th index angle $\theta_{ijk}$ of a j-th rotation axis under a measurement condition i can be expressed as the following formula 7:

$$dRr_i = ra0_i + ra1_i*\cos(\theta_{ijk}) + rb1_i*\cos(\theta_{ijk}) + ra2_i \cos(2\theta_{ijk}) + rb2_i \sin(2\theta_{ijk});$$

$$dRa_i = aa0_i + aa1_i*\cos(\theta_{ijk}) + ab1_i*\cos(\theta_{ijk}) + aa2_i \cos(2\theta_{ijk}) + ab2_i \sin(2\theta_{ijk}); \text{ and}$$

$$dRt_i = ta0_i + ta1_i*\cos(\theta_{ijk}) + tb1_i*\cos(\theta_{ijk}) + ta2_i \cos(2\theta_{ijk}) + tb2_i \sin(2\theta_{ijk}). \quad \text{Formula 7}$$

As the geometric error in the five-axis-control machining center in FIG. 1, the squareness between the X and Y axes is denoted as dCyx, the squareness between the Y and Z axes as dAxz, the squareness between the Z and X axes as dBxz, the X-direction error of the C-axis center position as dXca, the offset error between the C and A axes as dYca, the angular offset error of the A-axis as dAca, the squareness between the C and A axes as dBca, the Y-direction error of the A-axis center position as dYay, the Z-direction error of the A-axis center position as dZay, the squareness between the A and Z axes as dBay, and the squareness between the A and Y axes as dCay.

When a first measurement condition is determined as the A-axis of 0° and the C-axis of 0° to 360°, a second measurement condition is determined as the C-axis of −90° and the A-axis of −90° to +90°, and a third measurement condition is determined as the A-axis of −90° and the C-axis of 0° to 180°, relationships between the respective coefficients in the formula 7 and the geometric errors are the following formula 8. Here, each of $R_1$, $R_2$, and $R_3$ are distances from a rotational center to a ball center position on a plane where all the ball center positions instructed under the first, second and third measurement conditions are placed, namely, a radius of an arc trajectory. A modification of the formula 8 can acquire the respective geometric errors.

$$ra1_1 = -dXca - (dBca + dBay + dBxz)*H;$$

$$rb1_1 = dYca + dYay - (dAca + dAxz)*H;$$

$$rb2_1 = dCyx*R_1/2;$$

$$aa1_1 = dBca + dBay;$$

$$ab1_1 = dAca;$$

$$ra1_2 = -dYay;$$

$$rb1_2 = dZay;$$

$$rb2_2 = -dAxz*R_2/2;$$

$$aa1_2 = dCay;$$

$$ab1_2 = -(dBay + dBxz); \text{ and}$$

$$rb2_3 = dBxz*R_3/2 \qquad \text{Formula 8}$$

The error identification method and the error identification system with the above-described configuration allows the calibration of the length and diameter compensation values of the touch trigger probe 30 during a sequence of respective measurements for the geometric error identification. The need for manual work, except for the preparation work in advance, is eliminated. Accordingly, the preparation of an additional jig or a similar preparation is not required, ensuring a reduction in the machine operator load and reliable performance of the calibration of the touch trigger probe 30 during the geometric error identification. This does not deteriorate the measurement accuracy of the touch trigger probe 30, even if the state of the touch trigger probe 30 changes due to heat displacement, ensuring a high degree of accuracy in identifying the geometric error.

Further, the measurement system with the CCD camera or a similar system is not required, thus achieving a comparatively low price.

To acquire the reference block position, the configuration indirectly brings the reference tool into contact with the reference block using the block gauge. However, the reference tool may be directly brought into contact with the reference block without the block gauge.

Furthermore, the tool sensor position acquisition stage to the geometric error identification stage are executed once in the configuration. However, the tool sensor position acquisition stage to the relative position calculation stage may be executed once, and the reference tool position acquisition stage to the geometric error identification stage may be executed several times.

Figure 17:
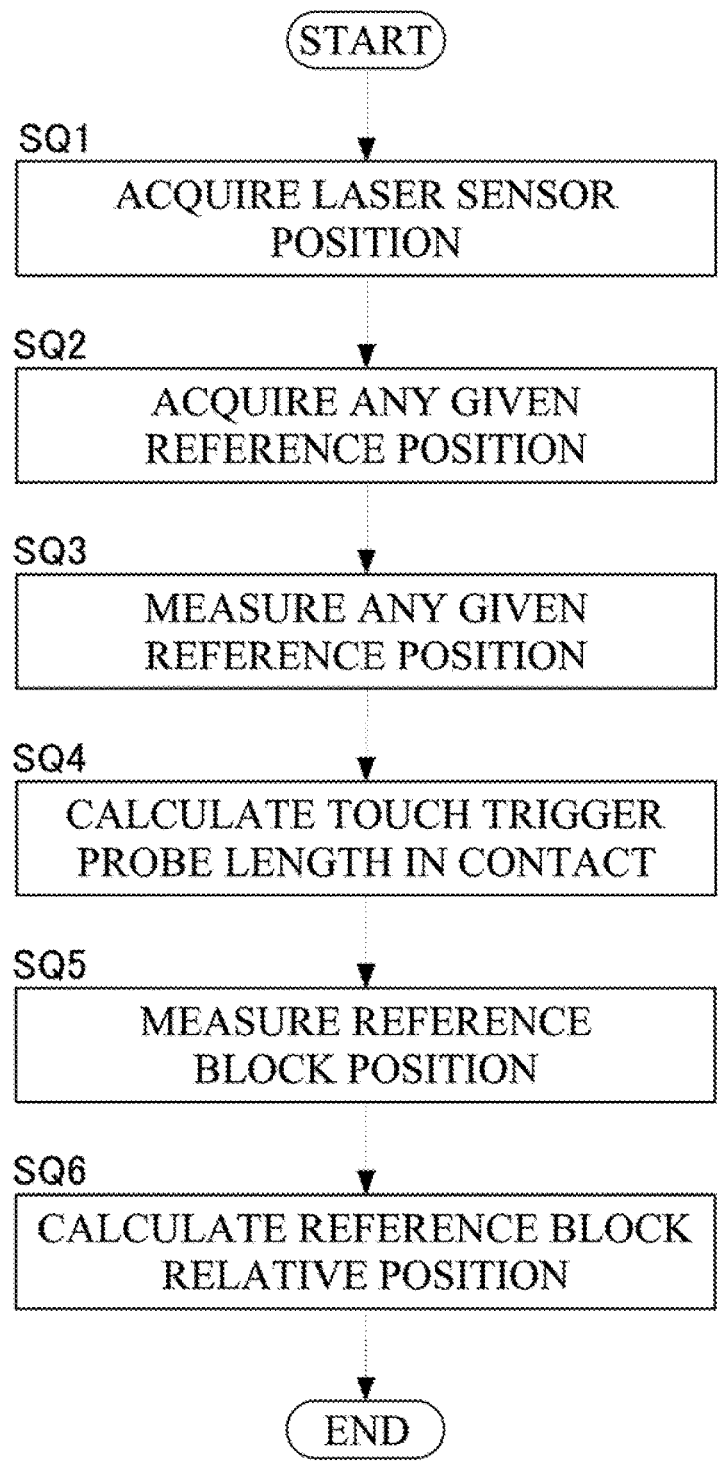
FIG. 17 is a flowchart for measurement preparation work of a modification example.

The following describes the error identification method and the error identification system according to another aspect of the present invention. It should be noted that, since the configurations are identical to the above-described configurations, other than the measurement preparation work, the following describes the measurement preparation work based on the flowchart in FIG. 17.

First, Step SQ1 is identical to Step SR1 in FIG. 7. That is, as illustrated in FIG. 8, the reference tool 8 is installed on the main spindle 2 and is measured by the laser sensor 40. Here, the Z-axis is moved such that the reference tool 8 approaches the laser light 14 and the Z-axis position at the time point of the distal end of the reference tool 8 cutting off the laser light 14 and the light-receiving rate being the threshold or less or the time point considering the signal delay is acquired. The storage unit (not illustrated) in the control device stores the acquired Z-axis position Zl (the tool sensor position acquisition stage and the tool sensor position acquisition means). The storage unit also preliminarily stores the length Td of the reference tool 8.

Figure 18:
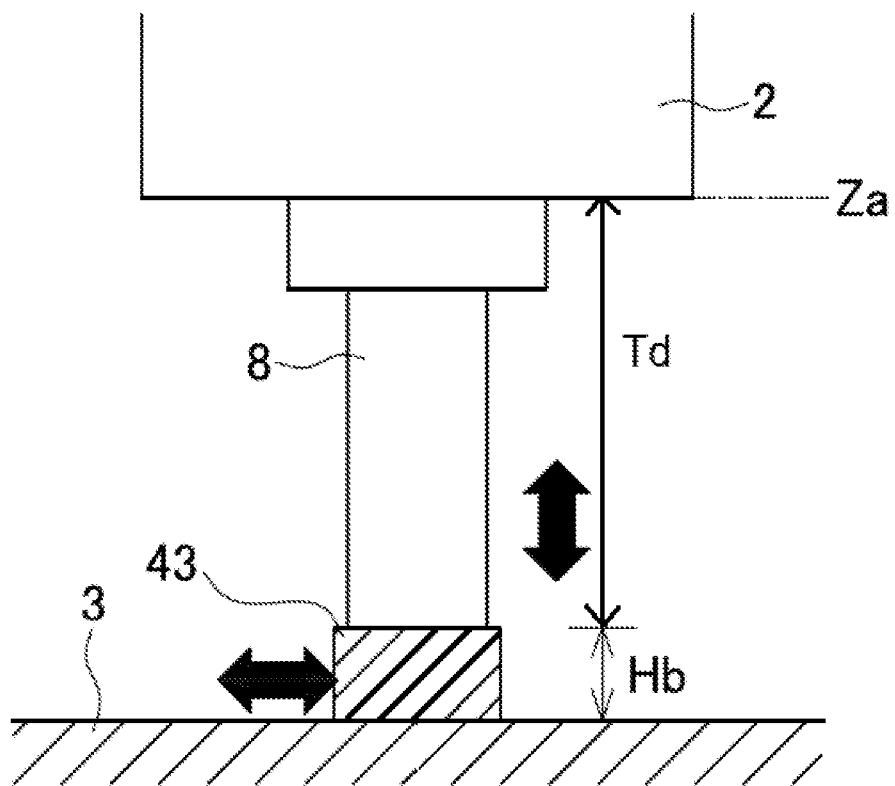
FIG. 18 is an explanatory view for Step SQ2 in the measurement preparation work of the modification example.

Next, at Step SQ2, the position of any given reference surface such as the top surface of the table or the jig is acquired with the reference tool 8 (a reference tool measurement position acquisition stage and reference tool measurement position acquisition means). For example, as illustrated in FIG. 18, with the reference tool 8 installed on the main spindle 2, the reference tool 8 is brought into contact with the top surface of the table 3 via the block gauge 43 to acquire a Z-axis position Za at the time. The storage unit (not illustrated) in the control device stores a value Za' found by subtracting the thickness Hb of the block gauge 43 from the Z-axis position Za (=Za−Hb). The block gauge 43 may not be a block gauge but may be a block with already-known thickness dimension or a similar block.

Figure 19:
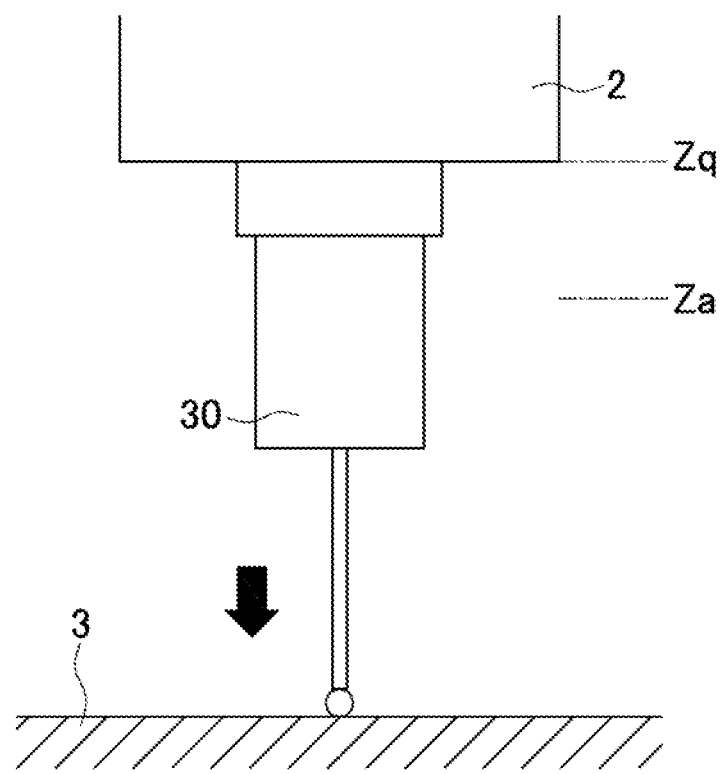
FIG. 19 is an explanatory view for Step SQ3 in the measurement preparation work of the modification example.

At Step SQ3, the touch trigger probe 30 is installed on the main spindle 2 to measure the position of the any given reference surface identical to Step SQ2 by the touch trigger probe 30 (a position measurement sensor measurement position acquisition stage and position measurement sensor measurement position acquisition means). For example, as illustrated in FIG. 19, the Z-axis is moved such that the touch trigger probe 30 approaches the top surface of the table 3. The Z-axis position Zp at the time point of the stylus of the touch trigger probe 30 contacting the top surface and the touch trigger probe 30 transmitting the trigger signal or the time point considering the signal delay is acquired. The storage unit (not illustrated) in the control device stores the acquired Z-axis position Zp.

At Step SQ4, the length of the touch trigger probe in contact is calculated. A touch trigger probe length in contact Tp (=Zq−Za+Td) is acquired from Za, which is stored at Step SQ2, Zq, which is stored at Step SQ3, and the reference tool length Td, and the storage unit stores the touch trigger probe length in contact Tp (a position measurement sensor length calculation stage and position measurement sensor length calculation means).

At Step SQ5, the reference block 42 is measured by the touch trigger probe 30 (a first reference block position acquisition stage and first reference block position acquisition means). That is, as illustrated in FIG. 10, the Z-axis is moved such that the touch trigger probe 30 approaches the reference block 42, and the Z-axis position Zp at the time point of the stylus of the touch trigger probe 30 contacting the reference block 42 and the touch trigger probe 30 transmitting the trigger signal or the time point considering the signal delay is acquired. The storage unit in the control device (not illustrated) stores the acquired Z-axis position Zp.

At Step SQ6, the relative position dZb (=Zl−Td−Zp+Tp) of the reference block 42 with respect to the laser sensor 40 is calculated from the Z-axis position Zl, which is stored at Step SQ1, the touch trigger probe 30 length in contact Tp, which is calculated at Step SQ4, the Z-axis position Zp, which is stored at Step SQ5, and the reference tool length Td, and is stored in the storage unit in the control device (the relative position calculation stage and the relative position calculation means).

While the procedure of the geometric error identification after this is identical to the above-described configurations described in FIG. 11 to FIG. 16, Step S1-2 in FIG. 13 becomes a second reference block position acquisition stage and second reference block position acquisition means.

Furthermore, in the modification example as well, the tool sensor position acquisition stage at Step SQ1 to the relative position calculation stage at Step SQ6 may be executed once, and the subsequent reference tool position acquisition stage to the geometric error identification stage may be executed several times.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An error identification method for measuring a position of a measured jig in a three-dimensional space and identifying a geometric error in a machine tool from a value of the measured position, in which the measured jig is secured on a table by a position measurement sensor installed to a main spindle in the machine tool, the machine tool including three or more translational axes, one or more rotation axes, the rotatable main spindle to which a tool is to be installed, the table, and a control device configured to control the respective translational axes, rotation axis, and main spindle, the error identification method comprising:

a tool sensor position acquisition stage of installing a reference tool for a length reference of the tool to the main spindle and acquiring a sensing position of a distal end of the reference tool with a tool sensor;

a reference block position acquisition stage of acquiring positions of the translational axes when the reference tool installed to the main spindle is directly or indirectly brought into contact with a reference block disposed at the tool sensor side;

a relative position calculation stage of calculating a relative position of the reference block with respect to the sensing position from the sensing position acquired in the tool sensor position acquisition stage and the positions of the translational axes acquired in the reference block position acquisition stage;

a reference tool position acquisition stage of installing the reference tool to the main spindle and acquiring a reference tool position with the tool sensor, the reference tool position being a distal end position of the reference tool;

a position measurement sensor measurement stage of installing the position measurement sensor to the main spindle and measuring a position of the reference block with the position measurement sensor;

a length compensation value calculation stage of calculating a length direction compensation value of the position measurement sensor from the reference tool position acquired in the reference tool position acquisition stage, the position of the reference block measured in the position measurement sensor measurement stage, the relative position calculated in the relative position calculation stage, and the length of the reference tool;

a diameter compensation value acquisition stage of acquiring a radial direction compensation value of the position measurement sensor with the measured jig;

a position measurement stage of indexing the rotation axis to a plurality of any given angles and measuring respective positions of the measured jig by the position measurement sensor;

a position compensation stage of compensating the value of the measured position at the position measurement stage using the length direction compensation value and the radial direction compensation value; and a geometric error identification stage of identifying the geometric error from the plurality of the value of the measured position compensated in the position compensation stage.

2. The error identification method according to claim 1, wherein the tool sensor position acquisition stage to the relative position calculation stage are configured to be executed once, the reference tool position acquisition stage to the geometric error identification stage being configured to be executed several times.

3. The error identification method according to claim 1, wherein the positions measured by the position measurement sensor are positions of the translational axes when the position measurement sensor senses a contact with a measurement object.

4. The error identification method according to claim 1, wherein the positions measured by the tool sensor are positions of the translational axes when the tool installed to the main spindle moves in the translational axes and the tool sensor senses a contact with the tool or passing of the tool.

5. The error identification method according to claim 1, wherein the measured jig has a spherical shape.

6. The error identification method according to claim 5, wherein the diameter compensation value acquisition stage includes measuring an initial position of the measured jig by the position measurement sensor, the diameter compensation value acquisition stage includes acquiring a compensation value of the position measurement sensor in a radial direction.

7. An error identification system for measuring a position of a measured jig in a three-dimensional space and identifying a geometric error in a machine tool from a value of the measured position, in which the measured jig is secured on a table by a position measurement sensor installed to a main spindle in the machine tool, the machine tool including three or more translational axes, one or more rotation axes, the rotatable main spindle to which a tool is to be installed, the table, and a control device configured to control the respective translational axes, rotation axis, and main spindle, the error identification system comprising:
- a reference tool for a length reference of the tool;
- a tool sensor configured to detect a distal end position of the reference tool installed to the main spindle;
- a reference block installed to the tool sensor side;
- a tool sensor position acquisition unit configured to move the reference tool installed to the main spindle in the translational axes and acquire and store a sensing position of the distal end of the reference tool with the tool sensor;
- a reference block position acquisition unit configured to move the reference tool installed to the main spindle in the translational axes to directly or indirectly bring the reference tool into contact with the reference block, the reference block position acquisition unit being configured to acquire and store positions of the translational axes at the contact;
- a relative position calculation unit configured to calculate and store a relative position of the reference block with respect to the sensing position from the sensing position acquired in the tool sensor position acquisition unit and the positions of the translational axes acquired in the reference block position acquisition unit;
- a reference tool position acquisition unit configured to move the reference tool installed to the main spindle in the translational axes, the reference tool position acquisition unit being configured to acquire and store a reference tool position with the tool sensor, the reference tool position being the distal end position of the reference tool;
- a measurement position acquisition unit configured to measure and store a position of the reference block with the position measurement sensor installed to the main spindle;
- a length compensation value calculation unit configured to calculate and store a length direction compensation value of the position measurement sensor from the reference tool position acquired in the reference tool position acquisition unit, the position of the reference block acquired in the measurement position acquisition unit, the relative position acquired in the relative position calculation unit, and the length of the reference tool;
- a diameter compensation value acquisition unit configured to acquire and store a radial direction compensation value of the position measurement sensor with the measured jig;
- a position compensation unit configured to index the rotation axis to a plurality of any given angles and compensate and store the respective values of the measured position of the measured jig measured by the position measurement sensor using the length direction compensation value and the radial direction compensation value; and
- a geometric error identification unit configured to identify the geometric error from the plurality of the values of the measured position compensated in the position compensation unit.

8. An error identification method for measuring a position of a measured jig in a three-dimensional space and identifying a geometric error in a machine tool from a value of the measured position, in which the measured jig is secured on a table by a position measurement sensor installed to a main spindle in the machine tool, the machine tool including three or more translational axes, one or more rotation axes, the rotatable main spindle to which a tool is to be installed, the table, and a control device configured to control the respective translational axes, rotation axis, and main spindle, the error identification method comprising:
- a tool sensor position acquisition stage of installing a reference tool for a length reference of the tool to the main spindle and acquiring a sensing position of a distal end of the reference tool with a tool sensor;
- a reference tool measurement position acquisition stage of acquiring any given tool measurement position with the reference tool installed to the main spindle;
- a position measurement sensor measurement position acquisition stage of acquiring any given sensor measurement position with the position measurement sensor installed to the main spindle;
- a position measurement sensor length calculation stage of acquiring a difference between the tool measurement position and the sensor measurement position and acquiring a length of the position measurement sensor based on the difference and the length of the reference tool;
- a first reference block position acquisition stage of measuring a position of a reference block disposed at the tool sensor side with the position measurement sensor installed to the main spindle;
- a relative position calculation stage of calculating a relative position of the reference block with respect to the sensing position from the sensing position acquired in the tool sensor position acquisition stage, the position of the reference block acquired in the first reference block position acquisition stage, the length of the position measurement sensor calculated in the position measurement sensor length calculation stage, and the length of the reference tool;
- a reference tool position acquisition stage of installing the reference tool to the main spindle and acquiring a reference tool position with the tool sensor, the reference tool position being a distal end position of the reference tool;
- a second reference block position acquisition stage of installing the position measurement sensor to the main spindle and measuring a position of the reference block with the position measurement sensor;
- a length compensation value calculation stage of calculating a length direction compensation value of the position measurement sensor from the reference tool position acquired in the reference tool position acquisition stage, the position of the reference block measured in the second reference block position acquisition stage, the relative position calculated in the relative position calculation stage, and the length of the reference tool;
- a diameter compensation value acquisition stage of acquiring a radial direction compensation value of the position measurement sensor with the measured jig;
- a position measurement stage of indexing the rotation axis to a plurality of any given angles and measuring respective positions of the measured jig by the position measurement sensor;
- a position compensation stage of compensating the values of the measured position at the position measurement stage using the length direction compensation value and the radial direction compensation value; and
- a geometric error identification stage of identifying the geometric error from the plurality of the values of the measured position compensated in the position compensation stage.

9. The error identification method according to claim 8, wherein
the tool sensor position acquisition stage to the relative position calculation stage are configured to be executed once, the reference tool position acquisition stage to the geometric error identification stage being configured to be executed several times.

10. The error identification method according to claim 8, wherein
the positions measured by the position measurement sensor are positions of the translational axes when the position measurement sensor senses a contact with a measurement object.

11. The error identification method according to claim 8, wherein
the positions measured by the tool sensor are positions of the translational axes when the tool installed to the main spindle moves in the translational axes and the tool sensor senses a contact with the tool or passing of the tool.

12. The error identification method according to claim 8, wherein
the measured jig has a spherical shape.

13. The error identification method according to claim 12, wherein
the diameter compensation value acquisition stage includes measuring an initial position of the measured jig by the position measurement sensor, the diameter compensation value acquisition stage including acquiring a compensation value of the position measurement sensor in a radial direction.

14. An error identification system for measuring a position of a measured jig in a three-dimensional space and identifying a geometric error in a machine tool from a value of the measured position, in which the measured jig is secured on a table by a position measurement sensor installed to a main spindle in the machine tool, the machine tool including three or more translational axes, one or more rotation axes, the rotatable main spindle to which a tool is to be installed, the table, and a control device configured to control the respective translational axes, rotation axis, and main spindle, the error identification system comprising:
a reference tool for a length reference of the tool;
a tool sensor configured to detect a distal end position of the reference tool installed to the main spindle;
a reference block installed to the tool sensor side;
a tool sensor position acquisition unit configured to move the reference tool installed to the main spindle in the translational axes and acquire and store a sensing position of the distal end of the reference tool with the tool sensor;
a reference tool measurement position acquisition unit configured to acquire and store any given tool measurement position with the reference tool installed to the main spindle;
a position measurement sensor measurement position acquisition unit configured to acquire and store any given sensor measurement position with the position measurement sensor installed to the main spindle;
a position measurement sensor length calculation unit configured to acquire a difference between the tool measurement position and the sensor measurement position, the position measurement sensor length calculation unit being configured to calculate and store a length of the position measurement sensor based on the difference and the length of the reference tool;
a first reference block position acquisition unit configured to measure and store a position of the reference block with the position measurement sensor installed to the main spindle;
a relative position calculation unit configured to calculate and store a relative position of the reference block with respect to the sensing position from the sensing position acquired in the tool sensor position acquisition unit, the position of the reference block acquired in the first reference block position acquisition unit, the length of the position measurement sensor calculated in the position measurement sensor length calculation unit, and the length of the reference tool;
a reference tool position acquisition unit configured to move the reference tool installed to the main spindle in the translational axes, the reference tool position acquisition unit being configured to acquire and store a reference tool position with the tool sensor, the reference tool position being the distal end position of the reference tool;
a second reference block position acquisition unit configured to measure and store a position of the reference block with the position measurement sensor installed to the main spindle;
a length compensation value calculation unit configured to calculate and store a length direction compensation value of the position measurement sensor from the reference tool position acquired in the reference tool position acquisition unit, the position of the reference block acquired in the second reference block position acquisition unit, the relative position calculated in the relative position calculation unit, and the length of the reference tool;
a diameter compensation value acquisition unit configured to acquire and store a radial direction compensation value of the position measurement sensor with the measured jig;
a position compensation unit configured to index the rotation axis to a plurality of any given angles and compensate and store the respective values of the measured position of the measured jig measured by the position measurement sensor using the length direction compensation value and the radial direction compensation value; and
a geometric error identification unit configured to identify the geometric error from the plurality of the values of the measured position compensated in the position compensation unit.

* * * * *